US008666868B2

(12) United States Patent  
Broms et al.

(10) Patent No.: US 8,666,868 B2  
(45) Date of Patent: *Mar. 4, 2014

(54) ADJUSTABLE DERIVATIVE SECURITIES AND METHOD FOR ADJUSTING THE VALUE OF SAME DUE TO A CORPORATE EVENT

(76) Inventors: Peter A. Broms, Glen Ridge, NJ (US); Andrew M. Scott, Brooklyn, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/598,576

(22) Filed: Aug. 29, 2012

(65) Prior Publication Data

US 2012/0323820 A1 Dec. 20, 2012

Related U.S. Application Data

(63) Continuation-in-part of application No. 13/480,125, filed on May 24, 2012, which is a continuation-in-part of application No. 12/972,383, filed on Dec. 17, 2010, now Pat. No. 8,200,565, which is a continuation-in-part of application No. 12/475,977, filed on Jun. 1, 2009, now Pat. No. 8,112,342, which is a continuation-in-part of application No. 10/154,742, filed on May 24, 2002, now Pat. No. 8,103,569, said application No. 12/972,383 is a continuation-in-part of application No. 11/588,807, filed on Oct. 27, 2006, now Pat. No. 8,145,551, which is a continuation-in-part of application No. 10/154,742.

(51) Int. Cl.  
*G06Q 40/00* (2012.01)

(52) U.S. Cl.  
USPC ............................................. 705/36 R

(58) Field of Classification Search  
USPC ......................................................... 705/36 R  
See application file for complete search history.

(56) References Cited

U.S. PATENT DOCUMENTS

2001/0037277 A1 11/2001 Willis et al.

OTHER PUBLICATIONS

Jack Clark Francis, et al., "The Handbook of Equity Derivatives," *Irwin Professional Publishing*, 1995, Chapter 13, pp. 284-329.  
Robert Hunter, "Players: Peter Broms: 11 Years and Counting", *Derivative Strategy*, p. 4, Jul. 1999.

(Continued)

*Primary Examiner* — Thomas M Hammond, III  
(74) *Attorney, Agent, or Firm* — IM IP Law PLLC; C. Andrew Im

(57) ABSTRACT

The claimed invention relates to an adjustable derivative contract. Particularly a method and system for adjusting the derivative contract to account for time value of money due to an occurrence of a corporate event that affects the value of the derivative contract. The claimed method and system allocates distributions amongst different derivative contracts, each derivative contract representing a different economic interest of at least two shares of an underlying security. The claimed invention uses the concepts of present and future values to value derivative contracts in order to more fairly and accurately represent the interests of the various holders of such derivative contracts upon the occurrence of a corporate event affecting the value of these derivative contracts.

20 Claims, 5 Drawing Sheets

(56) References Cited

OTHER PUBLICATIONS

Tom Pratt, "Phlx takes on Amex with new Americus securities", *Investment Dealers Digest*, p. 14 (Jan. 30, 1995).

David Mayers et al., "Journal of Applied Corporate Finance", *Bank of America*, vol. 15, No. 1, pp. 128-136 (Spring 2000).

Options Clearing Corporation, "Characteristics and Risk of Standardized Options", Feb. 1994, pp. 19-21, 33.

Robert Geske, "The Pricing of Options with Stochastic Dividend Yield", The Journal of Finance, vol. 33, No. 2, May 1978, pp. 620-621.

Fischer Black et al., "The Pricing of Options and Corporate Liabilities", The Journal of Political Economy, vol. 81, No. 3, May-Jun. 1973, p. 639.

Clifford W. Smith et al., "Valuing Employee Stock Option Plans Using Option Pricing Models", Journal of Accounting Research, vol. 14, No. 2, Autumn 1976, p. 362.

ADJUSTABLE DERIVATIVE SECURITIES AND METHOD FOR ADJUSTING THE VALUE OF SAME DUE TO A CORPORATE EVENT

RELATED APPLICATION

The present application is a continuation-in-part application of U.S. application Ser. No. 13/480,125 filed May 24, 2012, which is a continuation-in-part application of U.S. application Ser. No. 12/972,383 filed Dec. 17, 2010, now U.S. Pat. No. 8,200,565, which is a continuation-in-part application of U.S. application Ser. No. 12/475,977 filed Jun. 1, 2009, now U.S. Pat. No. 8,112,342, which is a continuation-in-part application of U.S. application Ser. No. 10/154,742 filed May 24, 2002, now U.S. Pat. No. 8,103,569, each of which is incorporated herein by reference in its entirety. U.S. application Ser. No. 12/972,383, now U.S. Pat. No. 8,200,565, is a continuation-in-part application of U.S. application Ser. No. 11/588,807 filed Oct. 27, 2006, now U.S. Pat. No. 8,145,551, which is a continuation-in-part application of U.S. application Ser. No. 10/154,742 filed May 24, 2002, now U.S. Pat. No. 8,103,569, each of which is incorporated herein by reference in its entirety.

BACKGROUND OF THE INVENTION

The financial industry created derivative securities (or derivatives) as a way to reallocate risk, create leverage, and provide a wider range of investment opportunities for its clients. These are securities whose prices are determined by, or "derive from," the prices of other securities. Popular examples of derivative securities include options and futures contracts. Standardized forms of these derivatives now regularly trade on various national and international exchanges. Because the value of derivatives depends on the value of the underlying securities, these can be powerful tools for hedging and speculation.

Option contracts, for example, are written on a variety of securities, such as common stock, stock indexes, foreign currency, agricultural commodities, precious metals, and interest rate futures. An investor may wish to purchase a call option, which allows the investor (option holder) to purchase the underlying security at a specified price (known as the exercise or strike price) during a fixed time period, if the investor believes the value of the underlying security will rise during that time period. For an American style option contract, if the price of the underlying stock rises above the strike price at any time during the fixed time period, the option holder may exercise his option to purchase the underlying common stock at the strike price and then immediately sell it at the market price. The option holder will only realize a profit if the difference between the market price and the strike price is greater than the original investment (premium) paid for the option contract. If the price of the underlying security does not rise above the strike price during the fixed time period, the option holder simply allows the option contract to expire, and his losses consist only of the premium paid for the option contract. A European option, in contrast, can only be exercised on the expiration date and would only be exercised if the stock is trading above the strike price on the expiration date.

An investor may also purchase a put option, which allows the option holder to sell the underlying security at a specified strike price during a fixed time period, if he believes that the value of the underlying security will drop during the fixed time period. For an American style option contract, if the price of the underlying security drops below the strike price at any time during the fixed time period, the option holder may exercise his option to sell the underlying security at the strike price. In order to exercise a put option, the option holder does not have to own the underlying security. Upon exercise, the investor's broker purchases the necessary shares/units of the underlying security at the market price and immediately delivers (or "puts" them) to an option writer for the strike price. The option holder will only realize a profit if the difference between the strike price and the market price of the underlying securities upon exercise is greater than the premium paid for the option. Again, if the price of the underlying security does not drop below the strike price during the fixed time period, the option holder can just allow the option contract to expire and lose no more than the premium paid for that option.

Conversely, the writers of call and put options generally sell these option contracts for a premium. They write options on the underlying securities for a variety of reasons. Security owners who feel bullish about their security may write a put option feeling that they can gain a premium of the option contract without risking much in return. Security owners may write a call option as a way of enforcing their sell disciplines. If an investor would sell their security if it reached a certain price in accordance with a disciplined investing strategy regardless of the surrounding circumstances, then such investors can write a call option to enforce that strategy and gain a premium in addition. Traditionally, equity options are created as contracts on 100 shares of the underlying stock. They are always created by purchasing an option, resulting in a long position, or writing an option, resulting in a short position. These are referred to as opening transactions. The option contracts are terminated by one of (a) letting the option expire, (b) exercising the contract, or (c) reversing the opening transaction in the market place. These are referred to as closing transactions.

The benefits associated with option contracts, which are only one form of derivative securities, are numerous. Investors can use them as hedging devices for minimizing risk. For example, an owner of a security may buy a put option on that security at a price that provides the investor with the comfort of knowing that he cannot lose more than a set amount of money for a specified time period. Investors can also enforce certain sell disciplines by writing call options as described above. Additionally, investors can speculate and leverage their stake in an underlying security through the purchase of call options in that underlying security as opposed to the purchase of the actual security. Combinations of the buying and selling of these simple option contracts provides a variety of products for the financial industry to offer its customers, appealing to the various investing strategies belonging to a wide range of customers.

The problem with the current treatment of option contracts is that upon the occurrence of a corporate event, such as a liquidating distribution, the holder of the derivative security must exercise any rights at that time or allow the security to expire. For example, assume that a corporate event has triggered liquidation of the common stock of a Company XYZ, with full distribution rights upon liquidation. Regardless of the price of the stock upon liquidation, the holder of a call option (the "holder") must now decide whether to exercise his option to purchase the common stock at the strike price and sell at the liquidating price. Even if the holder makes a profit upon such an occurrence, the holder does not gain the true benefit of the bargain contemplated when he entered into the option contract. He loses the remaining time period in which the underlying common stock could have appreciated even further. The holder paid a premium to speculate on the underlying stock for a specified time period, and now that period is getting shortened without an adjustment for the loss of time, for which the holder has already paid. There is a need for a process that accounts for the value of time when the holder is forced to exercise his option contract before the specified time period has expired, or when any investor is forced to exercise a derivative security before the bargained for time period has come to an end.

OBJECTS AND SUMMARY OF THE INVENTION

It is an object of the claimed invention to properly allocate gains and losses on investments in the derivative contracts upon the occurrence of corporate events related to the underlying securities, which cause the allotted time period for such derivatives to prematurely expire.

It is also an object of the claimed invention to adjust the value of the derivative contract representing an economic interest of a security upon their premature expiration to reflect the value of the time lost.

It is another object of the claimed invention to utilize the concept of present value to properly discount the value of the derivative contract upon their premature expiration to reflect the value of the time lost. In accordance with an exemplary embodiment of the claimed invention, the discount rate can be one of i) the interest rate on Treasury Securities maturing approximately at the termination date of the DORS® derivative contracts; ii) the internal rate of return of the OWLS® based on the Average OWLS Price, where OWLS is an option with limited stock derivative contract representing a nucleus of said at least two shares of the underlying security and Average OWLS price is the average price of the OWLS over a predetermined number of days before the announcement of the corporate event; iii) any other predetermined rate established by the exchange, sponsor or issuer of the derivative contracts. DORS® and OWLS® are registered trademarks of Americus Derivatives Corp.

It is a further object of the claimed invention to properly adjust the value of and number of shares/units of a security underlying the derivative contract upon a corporate event related to the underlying securities to properly reflect such event.

It is still a further object of the claimed invention to utilize the concept of present value in properly adjusting the number of shares/units of a security underlying the derivative contract upon a corporate event relating to the underlying security to properly reflect such event.

It is yet another object of the claimed invention that the allocation of the results of a corporate event among the derivative contracts be as fair as possible to the various holders of the derivative contracts.

It is still yet another object of the claimed invention that the originator or creator of the derivative contracts related to a security or stock experiencing a corporate event is never liable for more than the value of the security or stock underlying the derivative contracts, thus allowing the originator of the derivative contracts from a covered position to be fully hedged over the life of the derivative contracts.

The claimed invention relates to adjustable derivative contracts and a method for providing investors in the adjustable derivative contracts the fair value of their investment upon the occurrence of an event related to the underlying security that forces such investors to exercise their adjustable derivative contracts before the time period allotted to the derivative contracts has expired. In accordance with an exemplary embodiment of the claimed invention, the time value of money is used to readjust the value of the derivative contracts for the holder of the derivative contract as well as the investor who has written the derivative contract. The claimed invention further relates to adjustable derivative contracts and a method for generating and adjusting derivative or option contracts that trade based on two or more shares/units of the underlying security.

In accordance with an exemplary embodiment of the claimed invention, upon the occurrence of a corporate event related to the underlying security, for which the derivative contract's allotted time period prematurely expires, the exercise price or the termination claim of the derivative contract is readjusted to reflect the value of the time lost upon such premature expiration. The adjustment of the exercise price or termination claim is based on a discount rate "r" selected to approximate the true time value of money. This can be the interest rate on a designated Treasury security maturing soon after the termination date of the derivative contract. The discount or adjustment of the exercise price or termination claim may equate to a raising or lowering of the price according to the nature of the derivative contract. Any predetermined formula may be used to approximate the time value of money and discount the exercise price or termination claim. A discounting formula, which is utilized in illustrative examples infra, is used to lower the exercise price or termination claim according to its present value as follows:

$$PV=E/(1+r)^y$$

PV is the new exercise price or new termination claim adjusted to reflect its present value; E is the old exercise price or old termination claim; r is the discount rate, which may be chosen to most accurately reflect the time value of money; and y is the time that remains after a premature expiration of the allotted time period for a derivative contract, expressed in the same units as the discount rate. A related formula with the same variables, also utilized in illustrative examples herein, is used to raise the exercise price or termination claim to its future value as follows:

$$FV=E*(1+r)^y$$

In accordance with an exemplary embodiment of the claimed invention, factors other than the exercise price or termination claim of the derivative contract may be adjusted, upon an event that causes premature expiration, to provide the holder and writer of such derivative contract with a fairer distribution of the underlying asset. One such factor is the income or dividend stream of the security, which may be adjusted by taking the present value of the remaining nominal dividends at the discount rate as follows:

$$PV = \sum_{i=1}^{N} D_i/(1+r)_i^y$$

This time PV would be the present value of the stream of income; N is the number of remaining payments; the $D_i$ are the stream of income or dividend payments; again r is the discount rate; and the $y_i$ are the times to each of the $D_i$ dividend payments in the future.

In accordance with an exemplary embodiment of the claimed invention, the method adjusts a derivative contract to account for time value of money due to an occurrence of a corporate event that affects the value of the derivative contract. The processor based computer receives information identifying a corporate event that affects the value of the derivative contract, and financial information regarding the derivative contract comprises at least a termination claim of the derivative contract and the length of the derivative contract. Each derivative contract represents one of a plurality of economic interests of at least two shares of an underlying security: an option with limited stock (OWLS) derivative contract representing a nucleus of said at least two shares of the underlying security, and a residual interest in stock (RISKS®) derivative contract representing speculation on future gains on the value of said at least two shares of the underlying security. RISKS® is a registered trademark of Americus Derivatives Corp. Preferably, each derivative contract represents one of the economic interests of at least two shares/units of the underlying security. The termination claim determines the payout to the OWLS contract at the end of the derivative contract. The computer adjusts the termination claim of the derivative contract by reducing the termination claim by a future value of a payment to the OWLS discounted at an OWLS internal rate of return (IRR) to the termination claim. The computer adjusts one or more provisions of the derivative contract based on the adjusted termination claim and a predetermined formula for determining the effect of the corporate event on the derivative contract based on a type of distribution to the underlying security. The adjusted termination claim and the adjusted derivative contract are stored in a database.

In accordance with an exemplary embodiment of the claimed invention, the type of the distribution is a cash distribution and the derivative contracts comprise OWLS and RISKS derivative contracts. The aforesaid method allocates the entire cash distribution to the OWLS derivative contract if the cash distribution is less than or equal to the average price of the OWLS over a predetermined number of days before the announcement of the corporate event which is referred to herein as the Average OWLS Price. However, if the cash distribution is greater than the Average OWLS Price, the aforesaid method allocates a portion of the cash distribution up to the Average OWLS Price to the OWLS derivative contract and allocates the remaining portion of the cash distribution to the RISKS derivative contract. The adjusted termination is reduced to zero if the corporate event involves a full liquidating dividend.

In accordance with an exemplary embodiment of the claimed invention, at termination of the OWLS and RISKS derivative contracts, the aforesaid method allocates payment in cash or securities to the OWLS and RISKS derivative contracts based on the adjusted termination claim.

In accordance with an exemplary embodiment of the claimed invention, the type of the distribution to the underlying security is a common stock distribution, and the derivative contracts comprise OWLS and RISKS derivative contracts. After the common stock distribution, each derivative contract is now based on the same economic interest of at least two shares of the underlying security and at least one share of the distributed common stock as result of the common stock distribution. That is each derivative contract is now based on the economic interest of the combined securities. The aforesaid claimed method adjusts one or more provisions of each derivative contract based on the type of distribution to the combined securities as result of a corporate event. At termination of the OWLS derivative contract, the aforesaid claimed method allocates the OWLS percentage of the common stock distribution to the OWLS derivative contract based on the value of the OWLS derivative contract as a percentage of the combined value of the OWLS and RISKS derivative contracts. At termination of the RISKS derivative contract, the aforesaid claimed method allocates the RISKS percentage of the common stock distribution to the RISKS derivative contract based on the value of the RISKS derivative contract as a percentage of the combined value of the OWLS and RISKS derivative contracts. Preferably, a cash payment is provided in lieu of fractional shares allocated to the OWLS and RISKS derivative contracts.

In accordance with an exemplary embodiment of the claimed invention, the type of the distribution to the underlying security is a non-common stock securities distribution, and the derivative contracts comprise OWLS and RISKS derivative contracts. At the termination of the OWLS derivative contract, the aforesaid claimed method allocates entire said non-common stock securities distribution to the OWLS derivative contract if the market value of the non-common stock securities distribution is less than or equal to the present value of the termination claim or the Average OWLS Price. Otherwise, at the termination of the OWLS and RISK derivative contracts, the aforesaid claimed method allocates a portion of the non-common stock securities distribution having a value equal to the present value of the termination claim to the OWLS derivative contract and allocates the remaining portion of the non-common stock securities to the RISKS derivative contract if the market value of the non-common stock securities distribution is greater than the present value of the termination claim or the Average OWLS Price.

In accordance with an exemplary embodiment of the claimed invention, the type of the distribution is a cash distribution and the derivative contracts comprise OWLS derivative contract, RISKS derivative contract, a dividend value of stock (DIVS®) derivative contract representing a stream of dividends distributed to a holder of said at least two shares of the underlying security. DIVS® is a registered trademark of Americus Derivatives Corp. The aforesaid claimed method allocates to the DIVS derivative contract a portion of the cash distribution up to the present value of the reduction of the dividend paid on the underlying security over the remaining term of the DIVS derivative contract discounted at the risk free rate. An adjusted cash distribution is obtained by reducing the cash distribution by the payment to the DIVS derivative contract. The computer/processor allocates the entire adjusted cash distribution to the OWLS derivative contract if the adjusted cash distribution is less than or equal to the Average OWLS Price. However, if the adjusted cash distribution is greater than the Average OWLS Price, the computer/processor allocates a part of the adjusted cash distribution up to the Average OWLS Price to the OWLS derivative contract and allocates the remaining part of the adjusted cash distribution to the RISKS derivative contract. The adjusted termination is reduced to zero if the corporate event involves a full liquidating dividend.

In accordance with an exemplary embodiment of the claimed invention, at a pre-mature termination of the DIVS contract, the aforesaid method allocates a payment equal to the present value of the remaining nominal dividends discounted at the risk free rate. At termination of the OWLS and RISKS derivative contracts, the aforesaid method allocates payment in cash or securities to the OWLS and RISKS derivative contracts based on the adjusted termination claim.

In accordance with an exemplary embodiment of the claimed invention, the type of the distribution to the underlying security is a common stock distribution, and the derivative contracts comprise DIVS, OWLS and RISKS derivative contracts. After the common stock distribution, each DORS derivative contract is now based on the same economic interest of at least two shares of the underlying security and at least one share of the distributed common stock as result of the common stock distribution. That is each DORS derivative contract is now based on the economic interest of the combined securities. The aforesaid claimed method adjusts one or more provisions of each derivative contract based on the type of distribution to the combined securities as result of the corporate event, and allocates the entire dividend paid on the combined securities of the DORS derivative contract to the DIVS derivative contract. At the termination of the OWLS derivative contract, the aforesaid claimed method allocates the OWLS percentage of the common stock distribution to the OWLS derivative contract based on the value of the OWLS derivative contract as a percentage of the combined value of the OWLS and RISKS derivative contracts. At the termination of the RISKS derivative contract, the aforesaid claimed method allocates the RISKS percentage of the common stock distribution to the RISKS derivative contract based on the value of the RISKS derivative contract as a percentage of the combined value of the OWLS and RISKS derivative contracts. Preferably, a cash payment is provided in lieu of fractional shares allocated to the OWLS and RISKS derivative contracts In accordance with an exemplary embodiment of the claimed invention, the type of the distribution to the underlying security is a non-common stock securities distribution, and the derivative contracts comprise DIVS, OWLS and RISKS derivative contracts. At the termination of the DIVS derivative contract, the aforesaid claimed method allocates to the DIVS derivative contract a portion of the cash portion of the non-common securities distribution up to the sum of a predetermined percentage of the cash distribution and the present value of the reduction of the dividend paid on the underlying security over the remaining term of the DIVS derivative contract. The entire remaining portion of the non-common stock securities distribution is allocated to the OWLS derivative contract at the termination of the OWLS derivative contract if the market value of the non-common stock securities distribution is less than or equal to the present value of the termination claim. Otherwise, at the termination of the OWLS and RISKS derivative contracts, if the market value of the non-common stock securities distribution is greater than the present value of the termination claim, a part of the remaining portion of the non-common stock securities distribution having a value up to the present value of the termination claim is allocated to the OWLS derivative contract and the remaining part of the remaining portion of the non-common stock securities is allocated to the RISKS derivative contract.

In accordance with an exemplary embodiment of the claimed invention, the aforesaid claimed method the DORS derivative contracts can be forced into premature liquidation by the issuer of the DORS derivative contract.

In accordance with an exemplary embodiment of the claimed invention, the non-transitory computer readable storage medium comprises computer executable code for adjusting a derivative contract to account for time value of money due to an occurrence of a corporate event that affects the value of the derivative contract. The claimed code comprises instructions for the processor based computer to receive information identifying a corporate event that affects the value of the derivative contract and the financial information regarding the derivative contract comprising at least a termination claim of the derivative contract and the length of the derivative contract. Each derivative contract represents one of a plurality of economic interests of at least two shares of an underlying security: an option with limited stock (OWLS) derivative contract representing a nucleus of said at least two shares of the underlying security, and a residual interest in stock (RISKS) derivative contract representing speculation on future gains on the value of said at least two shares of the underlying security. Preferably, each derivative contract represents one of the economic interests of at least two shares/units of the underlying security. The termination claim determines the payout to the OWLS contract at the end of the derivative contract. The claimed code comprises instructions for the computer to adjust the termination claim of the derivative contract by reducing the termination claim by a future value of a payment to the OWLS discounted at an OWLS internal rate of return (IRR) to the termination claim. The claimed code comprises instructions for the computer to adjust one or more provisions of the derivative contract based on the adjusted termination claim and a predetermined formula for determining the effect of the corporate event on the derivative contract based on a type of distribution to the underlying security. The adjusted termination claim and the adjusted derivative contract are stored in a database.

The derivative contracts comprise OWLS and RISKS derivative contracts, and the type of the distribution to the underlying security is a cash distribution. In accordance with an exemplary embodiment of the claimed invention, the aforesaid claimed code comprises instructions for the computer to allocate the entire cash distribution to the OWLS derivative contract if the cash distribution is less than or equal to the Average OWLS Price. If the cash distribution is greater than the Average OWLS Price, the aforesaid claimed code comprises instructions for the processor to allocate a portion of the cash distribution up to the Average OWLS Price to the OWLS derivative contract and to allocate the remaining portion of the cash distribution to the RISKS derivative contract. The adjusted termination claim is reduced to zero if the corporate event involves a full liquidating dividend.

In accordance with an exemplary embodiment of the claimed invention, at termination of the OWLS and RISKS derivative contracts, the aforesaid code comprises instructions for allocating payment in cash or securities to the OWLS and RISKS derivative contracts based on the adjusted termination claim.

The derivative contracts comprise OWLS and RISKS derivative contracts, and the type of the distribution to the underlying security is a common stock distribution. After the common stock distribution, each derivative contract is now based on the same economic interest of at least two shares of the underlying security and at least one share of the distributed common stock as result of the common stock distribution. That is each derivative contract is now based on the economic interest of the combined securities. In accordance with an exemplary embodiment of the claimed invention, the aforesaid claimed code further comprises instructions for the processor to adjust one or more provisions of each derivative contract based on the type of the distribution to the combined securities as a result of the corporate event. At the termination of the OWLS derivative contract, the aforesaid claimed code further comprises instructions for the processor to allocate the OWLS percentage of the common stock distribution to the OWLS derivative contract based on the value of the OWLS derivative contract as a percentage of the combined value of the OWLS and RISKS derivative contracts. At the termination of the RISKS derivative contract, the aforesaid claimed code further comprises instructions for the processor to allocate the RISKS percentage of the common stock distribution to the RISKS derivative contract based on the value of the RISKS derivative contract as a percentage of the combined value of the OWLS and RISKS derivative contracts.

The derivative contracts comprise OWLS and RISKS derivative contracts, and the type of the distribution to the underlying security is a non-common stock securities distribution. In accordance with an exemplary embodiment of the claimed invention, at the termination of the OWLS derivative contract, the aforesaid claimed code further comprises instructions for the processor to allocate the entire non-common stock securities distribution to the OWLS derivative contract if the market value of the non-common stock securities distribution is less than or equal to the present value of the termination claim. At the termination of the OWLS and RISKS derivative contracts, if the market value of the non-common stock securities distribution is greater than the present value of the termination claim, the aforesaid claimed code further comprises instructions for the processor to allocate a portion of the non-common stock securities distribution having a value equal to the present value of the termination claim to the OWLS derivative contract and the remaining portion of the non-common stock securities to the RISKS derivative contract.

The derivative contracts comprise DIVS, OWLS and RISKS derivative contracts, and the type of the distribution to the underlying security is a cash distribution. In accordance with an exemplary embodiment of the claimed invention, the aforesaid claimed code comprises instructions for the processor to allocate to the DIVS derivative contract a portion of the cash distribution up to the present value of the reduction of the dividend paid on the underlying security over the remaining term of the DIVS derivative contract discounted at the risk free rate. An adjusted cash distribution is obtained by reducing the cash distribution by the payment to the DIVS derivative contract. The aforesaid claimed code comprises instructions for the computer/processor to allocate the entire adjusted cash distribution to the OWLS derivative contract if the adjusted cash distribution is less than or equal to the Average OWLS Price. However, if the adjusted cash distribution is greater than the Average OWLS Price, the aforesaid claimed code comprises instructions for the computer/processor to allocate a part of the adjusted cash distribution up to the Average OWLS Price to the OWLS derivative contract and allocates the remaining part of the adjusted cash distribution to the RISKS derivative contract. The adjusted termination is reduced to zero if the corporate event involves a full liquidating dividend.

In accordance with an exemplary embodiment of the claimed invention, at a pre-mature termination of the DIVS contract, the aforesaid code comprises instructions for allocating a payment equal to the present value of the remaining nominal dividends discounted at the risk free rate. At termination of the OWLS and RISKS derivative contracts, the aforesaid code comprises instructions for allocating payment in cash or securities to the OWLS and RISKS derivative contracts based on the adjusted termination claim.

The derivative contracts comprise DIVS, OWLS and RISKS derivative contracts, and the type of the distribution to the underlying security is a common stock distribution. After the common stock distribution, each DORS derivative contract is now based on the same economic interest of at least two shares of the underlying security and at least one share of the distributed common stock as result of the common stock distribution. That is each DORS derivative contract is now based on the economic interest of the combined securities. In accordance with an exemplary embodiment of the claimed invention, the aforesaid claimed code further comprises instructions for the processor to adjust one or more provisions of each derivative contract based on the type of distribution to the combined securities as result of the corporate event, and to allocate the entire dividend paid on the combined securities of the DORS derivative contract to the DIVS derivative contract. At the termination of the OWLS derivative contract, the aforesaid claimed code further comprises an instruction for the processor to allocate the OWLS percentage of the common stock distribution to the OWLS derivative contract based on the value of the OWLS derivative contract as a percentage of the combined value of the OWLS and RISKS derivative contracts. At the termination of the RISKS derivative contract, the aforesaid claimed code further comprises instructions for the processor to allocate the RISKS percentage of the common stock distribution to the RISKS derivative contract based on the value of the RISKS derivative contract as a percentage of the combined value of the OWLS and RISKS derivative contracts.

The DORS derivative contracts comprise DIVS, OWLS and RISKS derivative contracts, and the type of the distribution to the underlying security is a non-common stock securities distribution. In accordance with an exemplary embodiment of the claimed invention, at the termination of the DIVS derivative contract, the aforesaid claimed code further comprises instructions for the processor to allocate to the DIVS derivative contract a portion of the cash portion of the non-common securities distribution up to the sum of a predetermined percentage of the cash distribution and the present value of reduction of the dividend paid on the underlying security over the remaining term of the DIVS derivative contract. At the termination of the OWLS derivative contract, the aforesaid claimed code further comprises instructions for the processor to allocate the entire remaining portion of the non-common stock securities distribution to the OWLS derivative contract if the market value of the non-common stock securities distribution is less than or equal to the present value of the termination claim. In this case the RISKS derivative contract would terminate with no value. If the market value of the non-common stock securities distribution is greater than the present value of the termination claim at the termination of the OWLS and RISKS derivative contracts, the aforesaid claimed code further comprises instructions for the processor to allocate a part of the remaining portion of the non-common stock securities distribution having a value equal to the present value of the termination claim to the OWLS derivative contract and the remaining part of the remaining portion of the non-common stock securities to the RISKS derivative contract.

In accordance with an exemplary embodiment of the claimed invention, the aforesaid claimed code further comprises instructions for the processor to force premature liquidation of the DORS derivative contracts at the request of the issuer of the DORS derivative contract.

In accordance with an exemplary embodiment of the claimed invention, the system for adjusting a derivative contract to account for time value of money due to an occurrence of a corporate event that affects the value of the derivative contract comprises a processor and a database. The processor based computer is programmed to receive information identifying a corporate event that affects the value of the derivative contract and financial information regarding a derivative contract comprising at least a termination claim of the derivative contract and the length of the derivative contract. Each derivative contract represents one of a plurality of economic interests of at least two shares of an underlying security: an option with limited stock (OWLS) derivative contract representing a nucleus of said at least two shares of the underlying security, and a residual interest in stock (RISKS) derivative contract representing speculation on future gains on the value of said at least two shares of the underlying security. The termination claim determines the payout to the OWLS contract at the end of the derivative contract. The computer adjusts the termination claim of the derivative contact by reducing the termination claim by a future value of a payment to the OWLS discounted at the OWLS internal rate of return (IRR) to the termination claim or based on the Average OWLS Price. Further, the computer adjusts one or more provisions of the derivative contract based on the adjusted termination claim and a predetermined formula for determining the effect of the corporate event on the derivative contract based on a type of distribution to the underlying security. The database stores an adjusted termination claim and an adjusted derivative contract.

The derivative contracts comprise OWLS and RISKS derivative contracts, and the type of the distribution to the underlying security is a cash distribution. In accordance with an exemplary embodiment of the claimed invention, the aforesaid computer allocates the entire cash distribution to the OWLS derivative contract if the cash distribution is less than or equal to the Average OWLS Price. If the cash distribution is greater than the Average OWLS Price, the aforesaid computer allocates a portion of the cash distribution up to the Average OWLS Price to the OWLS derivative contract and allocates the remaining portion of the cash distribution to the RISKS derivative contract. The adjusted termination claim is reduced to zero if the corporate event is a full liquidating dividend.

In accordance with an exemplary embodiment of the claimed invention, at termination of the OWLS and RISKS derivative contracts, the aforesaid computer allocates payment in cash or securities to the OWLS and RISKS derivative contracts based on the adjusted termination claim.

The derivative contracts comprise OWLS and RISKS derivative contracts, and the type of the distribution to the underlying security is a common stock distribution. After the common stock distribution, each derivative contract is now based on the same economic interest of at least two shares of the underlying security and at least one share of the distributed common stock as result of the common stock distribution. That is each derivative contract is now based on the economic interests of the combined securities. In accordance with an exemplary embodiment of the claimed invention, the aforesaid claimed processor adjusts one or more provisions of each derivative contract based on the type of the distribution to the combined securities as a result of the corporate event. At the termination of the OWLS derivative contract, the aforesaid claimed processor allocates the OWLS percentage of the common stock distribution to the OWLS derivative contract based on the value of the OWLS derivative contract as a percentage of the combined value of the OWLS and RISKS derivative contracts. At the termination of the RISKS derivative contract, the aforesaid claimed processor allocates the RISKS percentage of the common stock distribution to the RISKS derivative contract based on the value of the RISKS derivative contract as a percentage of the combined value of the OWLS and RISKS derivative contracts.

The derivative contracts comprise OWLS and RISKS derivative contracts, and the type of the distribution to the underlying security is a non-common stock securities distribution. At the termination of the OWLS derivative contract, in accordance with an exemplary embodiment of the claimed invention, the aforesaid claimed processor allocates the entire non-common stock securities distribution to the OWLS derivative contract if the market value of the non-common stock securities distribution is less than or equal to the present value of the termination claim. In this case the RISKS derivative contract would terminate with no value. At the termination of the OWLS and RISKS derivative contracts, if the market value of the non-common stock securities distribution is greater than the present value of the termination claim, the aforesaid claimed processor allocates a portion of the non-common stock securities distribution having a value equal to the present value of the termination claim to the OWLS derivative contract and the remaining portion of the non-common stock securities to the RISKS derivative contract.

The derivative contracts comprise DIVS, OWLS and RISKS derivative contracts, and the type of the distribution to the underlying security is a cash distribution. In accordance with an exemplary embodiment of the claimed invention, the aforesaid claimed processor allocates to the DIVS derivative contract a portion of the cash distribution up to the present value of the reduction of the dividend paid on the underlying security over the remaining term of the DIVS derivative contract discounted at the risk free rate. The adjusted cash distribution is obtained by reducing the cash distribution by the payment to the DIVS derivative contract. The aforesaid computer allocates the entire adjusted cash distribution to the OWLS derivative contract if the adjusted cash distribution is less than or equal to the Average OWLS Price. If the adjusted cash distribution is greater than the Average OWLS Price, the aforesaid computer allocates a portion of the adjusted cash distribution up to the Average OWLS Price to the OWLS derivative contract and allocates the remaining portion of the adjusted cash distribution to the RISKS derivative contract. The adjusted termination claim is reduced to zero if the corporate event is a full liquidating dividend.

In accordance with an exemplary embodiment of the claimed invention, at a pre-mature termination of the DIVS contract, the aforesaid computer allocates a payment equal to the present value of the remaining nominal dividend discounted at the risk free rate. At termination of the OWLS and RISKS derivative contracts, the aforesaid computer allocates payment in cash or securities to the OWLS and RISKS derivative contracts based on the adjusted termination claim.

The derivative contracts comprise DIVS, OWLS and RISKS derivative contract, and the type of the distribution to the underlying security is a common stock distribution. After the common stock distribution, each DORS derivative contract is now based on the same economic interest of at least two shares of the underlying security and at least one share of the distributed common stock as result of the common stock distribution. That is each DORS derivative contract is now based on the economic interests of the combined securities. In accordance with an exemplary embodiment of the claimed invention, the aforesaid claimed processor adjusts one or more provisions of each derivative contract, based on the type of distribution, to the combined securities as result of the corporate event, and allocates the entire dividend paid on the combined securities of the DORS derivative contract to the DIVS derivative contract. At the termination of the OWLS derivative contract, the aforesaid claimed processor allocates the OWLS percentage of the common stock distribution to the OWLS derivative contract based on the value of the OWLS derivative contract as a percentage of the combined value of the OWLS and RISKS derivative contracts. At the termination of the RISKS derivative contract, the aforesaid claimed processor allocates the RISKS percentage of the common stock distribution to the RISKS derivative contract based on the value of the RISKS derivative contract as a percentage of the combined value of the OWLS and RISKS derivative contracts.

The derivative contracts comprise DIVS, OWLS and RISKS derivative contracts, and the type of the distribution to the underlying security is a non-common stock securities distribution. At the termination of the DIVS derivative contract, in accordance with an exemplary embodiment of the claimed invention, the aforesaid claimed processor allocates to the DIVS derivative contract a portion of the cash portion of the non-common securities distribution up to the sum of a predetermined percentage of the cash distribution and the present value of the reduction of the dividend paid on the underlying security over the remaining term of the DIVS derivative contract. At the termination of the of the OWLS derivative contract, the aforesaid claimed processor allocates the entire remaining portion of the non-common stock securities distribution to the OWLS derivative contract if the market value of the non-common stock securities distribution is less than or equal to the present value of the termination claim. If the market value of the non-common stock securities distribution is greater than the present value of the termination claim at the termination of the OWLS and RISKS derivative contracts, the aforesaid claimed processor allocates a part of the remaining portion of the non-common stock securities distribution having a value equal to the present value of the termination claim to the OWLS derivative contract and the remaining part of the remaining portion of the non-common stock securities to the RISKS derivative contract.

Various other objects, advantages, and features of the claimed invention will become readily apparent from the ensuing detailed description, and the novel features will be particularly pointed out in the appended claims.

BRIEF DESCRIPTION OF THE FIGURES

The following detailed description, given by way of example, and not intended to limit the claimed invention solely thereto, will best be understood in conjunction with the accompanying drawings in which:

DETAILED DESCRIPTION OF THE EMBODIMENTS

Figure 1:
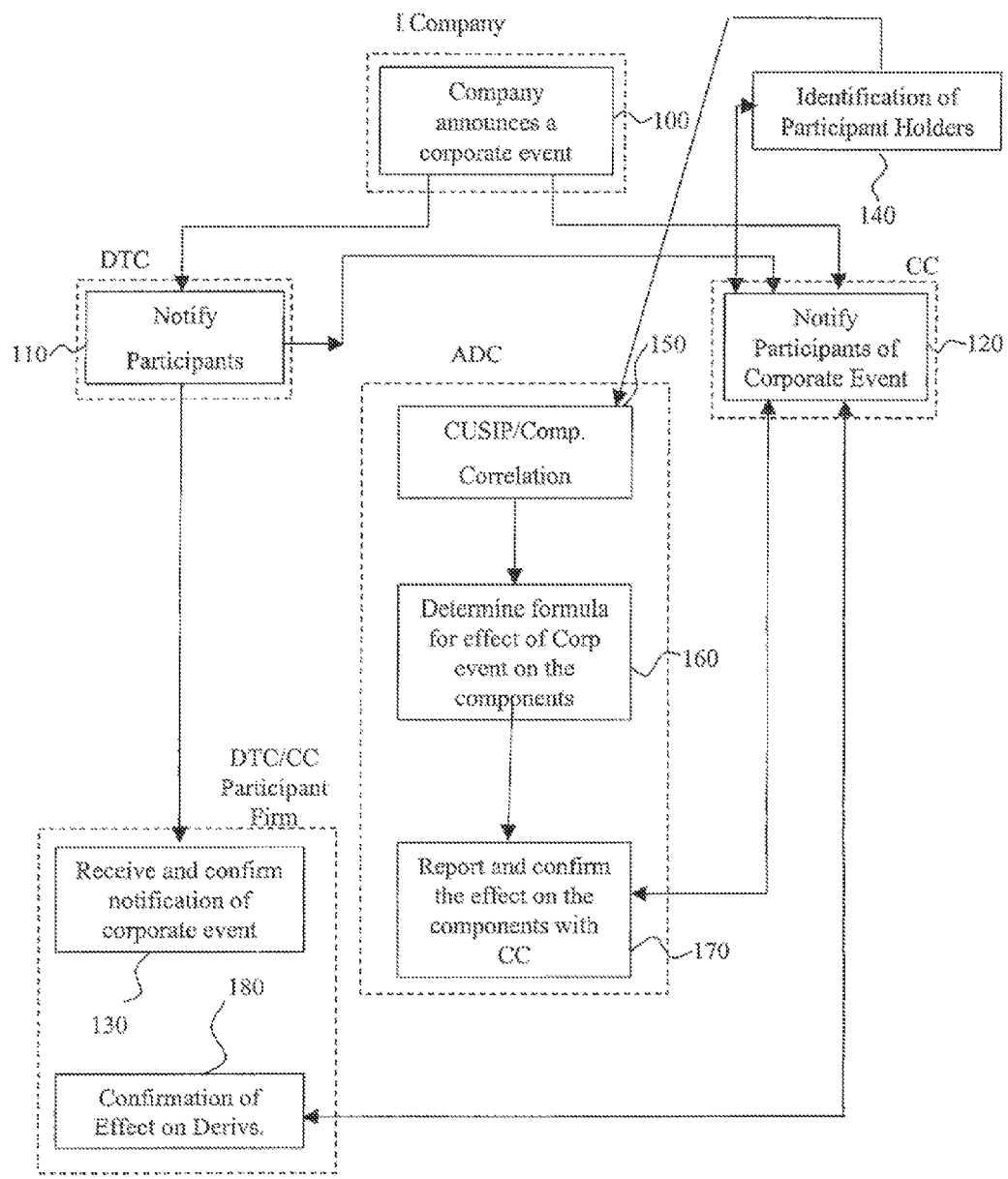
FIG. 1 is a flow chart illustrating the activities undertaken upon the announcement of a corporate event.

Before referring to the drawings in detail, it will be understood that for the purposes of this invention, the terms derivatives, options, derivative securities, derivative security contracts, derivative contracts, option contracts, adjustable derivative contracts and futures contracts may all be used interchangeably. Also, it will be understood that for the purposes of this invention, the terms exercise price and termination claim may be used interchangeably. It will also be understood that while the examples herein disclose contracts having a five year time period and settling in stock with European style expiration, the claimed invention will apply to contracts of longer or shorter time and can settle in stock or cash and have European or American style expiration. It will also be understood that the term derivatives or derivative contracts can be used to describe the scenario where the derivative contract is based on more than a share or unit of the underlying security. The underlying security can be any security that trades in an exchange or electronic exchange, such as New York Stock Exchange (NYSE), National Association of Securities Dealers Automated Quotations Systems (NASDAQ), etc. It is appreciated that the security includes but is not limited to a common stock, a preferred stock, an index, an exchange-traded fund (ETFs), a family of ETFs or a SPDR®, bonds, commodities, warrants, etc. SPDR® is a registered trademark of Standard & Poor's Financial Services LLC. The term "share" and "unit" are used interchangeably herein depending on the type of the security.

According to an embodiment of the claimed invention, upon the occurrence of a corporate event, several financial organizations coordinate the notification of the event to the appropriate parties, the processing, and valuation of the derivative securities at issue, and the reporting of such valuations. These financial organizations include Depository Trust Corporation ("DTC"), a Clearing Corporation ("CC"), and Americus Derivatives Corporation ("ADC"). They accomplish these tasks in two series of events, one taking place on the date that the corporate event is announced, and the other taking place on the actual date that the corporate event takes effect.

In accordance with an exemplary embodiment of the claimed invention, the system and method processes corporate events to insure that arbitrageurs long common stock, and short DIVS, OWLS and RISKS derivative contracts are not liable for more than the value of a share of the underlying common stock. The claimed invention thereby eliminates unusual exposure to corporate events for arbitrageurs, and drastically increases the liquidity for the DORS (DIVS, OWLS and RISKS) derivative contracts. The arbitrageur long common stock and short DORS derivative contracts for the same series can never be liable for more than the long position in the underlying common stock.

In accordance with an exemplary embodiment of the claimed invention, the results of any corporate event are divided and distributed between the DIVS, OWLS and RISKS as fairly as possible in relation to the investment purpose of each of the DORS derivative contracts prior to the announced corporate event.

In accordance with an exemplary embodiment of the claimed invention, the CC or OCC ("Options Clearing Corporation") can force premature liquidation of existing European derivative contracts or open DORS contracts insuring that the DIVS, OWLS and RISKS owners/holders receive fair value for their derivative contracts.

As illustrated in FIG. 1, a company initiates the whole process by announcing a corporate event in step 100. The company notifies participant members of DTC, which, on behalf of participant members, may serve as the repository for the company's equity, in step 110. DTC then notifies (i) CC, which maintains records that identify all member firm holders of the relevant derivative securities, in step 120; and (ii) DTC/CC participant firm, which can identify customer holdings, reconcile such holdings to ADC, and notify customers and the company of relevant information, in step 130. As set forth in commonly owned U.S. Pat. Nos. 5,671,358 and 5,758,097, the claimed invention can be implemented using processor based computers and/or servers at the DTC, ADC, CC and DTC/CC participant firm. The company's computer communicates with the DTC's computer to announce the corporate event in step 100. As it learns of the corporate event, the DTC's computer disseminates this information to its participants in step 110. The DTC's computer then notifies the CC's computer and DTC/CC participant firm's computer in step 120. The DTC/CC participant's computer identifies customer holdings, reconciles such holdings to ADC's computer, and notifies customers and the company computers of relevant information in step 130.

ADC requests from CC, information that identifies member firm holders of record of the derivative contracts pertinent to a derivative contract valuation, and CC responds with the pertinent information in step 140. That is, the ADC's computer sends a request to the CC's computer for information identifying member firm holders of record of the derivative contracts pertinent to a derivative contract valuation, and CC's computer responds with the pertinent information in step 140. ADC then performs three tasks in order to establish the valuation of the various derivative contracts for the eligible holders of such derivative contracts:

1. The CUSIP correlation computer means of the ADC's computer performs a Committee on Uniform Securities Identification Procedures ("CUSIP") correlation for correlating the equity at issue with the various derivative contracts related to such equity, such as dividend value of stock (DIVS), option with limited stock (OWLS) and residual interest in stock (RISKS), using the CUSIP data from a CUSIP file or memory storage means in step 150;
2. The ADC's computer determines any needed formulas for calculating the effect of the corporate event on the various derivative contracts in step 160; and
3. The ADC's computer reports and confirms the effect on the derivative contracts with the CC's computer in step 170.

The CC's computer then reports and confirms the effect on the derivative contracts with DTC/CC participant firm's computer in step 180.

Figure 2:
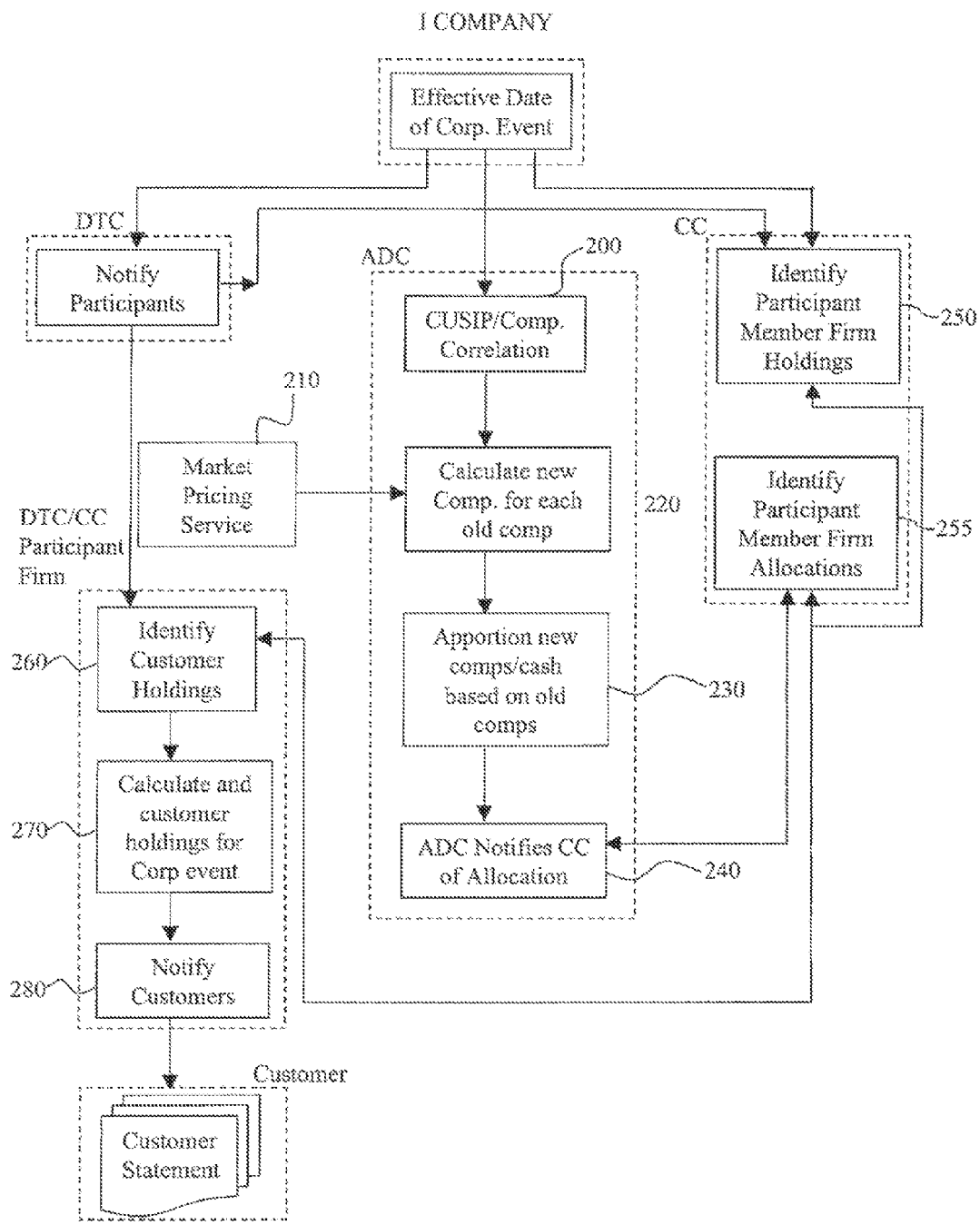
FIG. 2 is a flow chart illustrating the activities on the effective day of the corporate event.

The second part of this process is executed on the effective date of the corporate event as illustrated in FIG. 2. On the effective date, the CUSIP correlation computer means of the ADC's computer performs a CUSIP correlation computation using the CUSIP data from a CUSIP file or memory storage means (e.g., database and other comparable computer storage device), correlating the equity at issue with the relevant derivative contracts in step 200. The ADC's computer then receives pricing information from a Market Pricing Service computer in step 210, and uses that pricing information along with the formulas previously determined in step 160 (FIG. 1) to compute and store new time adjusted values for the relevant derivative contracts in a computer file, storage disk or database in step 220. It is hereby appreciated that the pricing information used in computing new time adjusted values may be the market price of one of the derivative contract based on the underlying security on the effective date of the corporate event, or an average of the market price over a specified period of time prior to the effective date of the corporate event, or any other predetermined price or pricing formula. The vote apportioning computer means of the ADC's computer then allocates and stores values to the relevant derivative contracts based on the time adjusted valuations in the computer file, storage disk or database in step 230. The ADC's computer notifies the CC's computer of the adjusted valuations in step 240, where the CC's computer adjusts the positions of its member firms to reflect the adjustments made by the ADC's computer. The CC's computer then transmits this adjustment information to the member firms' computer in steps 250 and 255, who then identify customer holdings in step 260, adjust the customer holdings accordingly in step 270, and notify the customers through a customer statement in step 280.

The claimed invention relates to the process undertaken by ADC in the above examples, or similar financial organizations, in adjusting the effected derivative contracts upon the occurrence of a corporate event. The claimed invention provides ADC, or any like organization which processes derivative contracts, a process for computing the adjustments to such derivative contracts, which factors in the time value of money.

Figure 3:
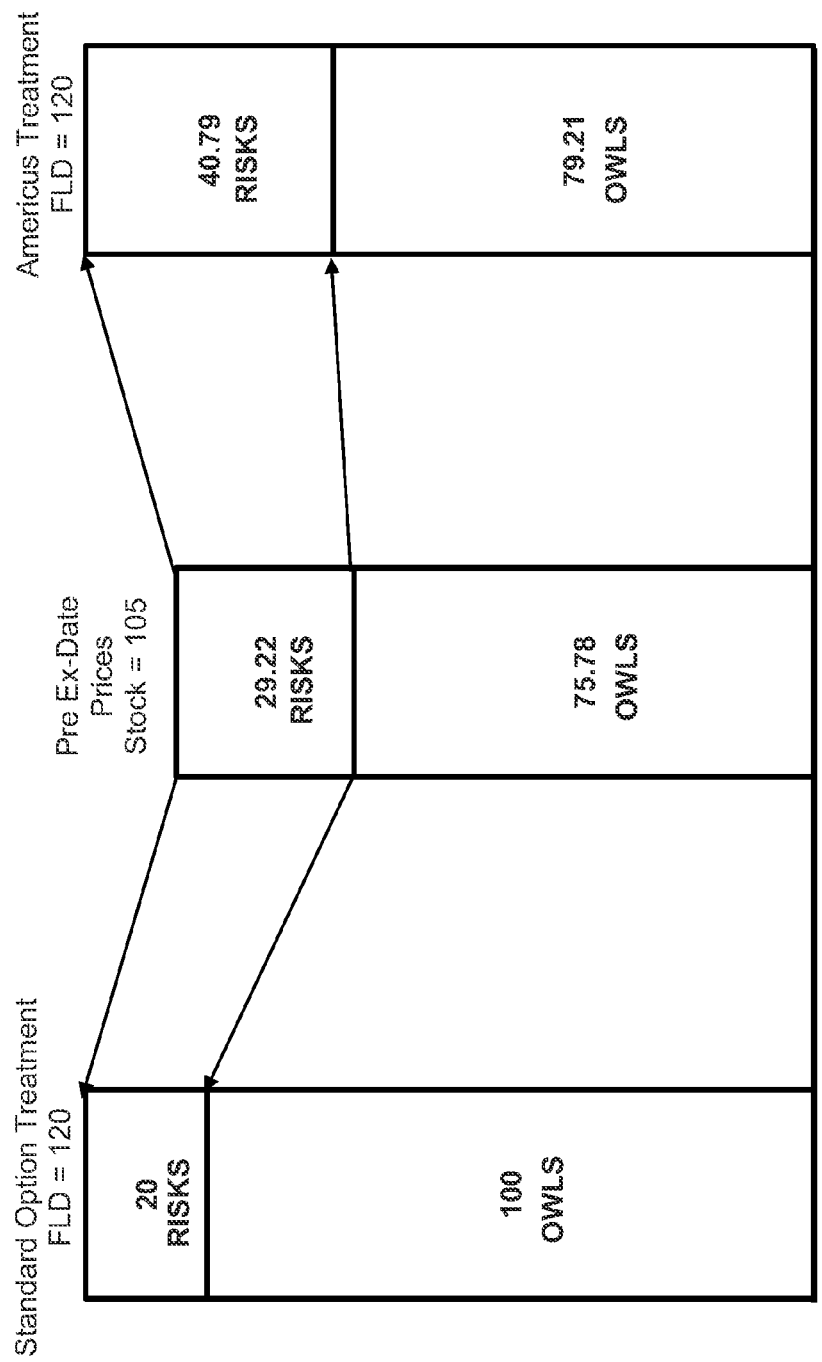
FIG. 3 is a chart illustrating an exemplary embodiment of the inventive process which allocates funds to the OWLS and RISKS contracts of a security upon a corporate event triggering a full liquidation.

In accordance with an exemplary embodiment of the claimed invention as illustrated in FIG. 3 and Table 1, the derivative contract comprises an American Style call option on a 100 shares of common voting stock in a blue chip corporation (XYZ) with a five (5) year fixed time period, which will be assumed to equate to 1825 days for the purposes of the calculations for this example. The holder of the option can exercise or call the option at any time during this time period. The holder paid $29.22 per share for this option with a strike price of $100, meaning that the investor can purchase the 100 shares of XYZ at the price of $100 per share at any time during the allotted five year time period.

TABLE 1

FULL LIQUIDATING DIVIDEND
(Company ABC trading in RISKS and OWLS only)

Assumed Stock Parameters

| | | | |
|---|---|---|---|
| Dividend | $ 0.00 | Stock Price | $105.00 |
| Days to Term | 1460 | CALLS (RISKS) Price | $ 29.22 |
| Years to Term | 4 | Covered WRITES (OWLS) Price | $ 75.78 |
| Termination Claim | $ 100.00 | | |
| Standard Deviation | 16% | | |
| Risk Free Rate | 6% | | |

Standard option treatment

1. The Termination Claim is not adjusted.
2. Payment to the Covered Writes is the lesser of the TC or the liquidating dividend.
3. The CALLS receive any money left after the Covered Writes are paid.

Claimed Invention: Americus derivative treatment

1. The Termination Claim is adjusted by taking the present value of the original TC discounted at the risk free rate from the termination date to the present.
2. Payment to the Covered Writes (OWLS) is the lesser of the adjusted TC or the liquidating dividend.
3. The CALLS (RISKs) receives any money left after the Covered Writes (OWLS) are paid

| | | |
|---|---|---|
| Adj. Term Claim | 79.21 | PV of the Termination Claim discounted at the risk free rate 79.21 = 100/[(1 + .06)^4] |

CALL option (RISKS) price comparison
For a Full Liquidating Dividend

| | Initial Price | Standard Option Treatment (CALLS) | Americus Treatment (RISKS) |
|---|---|---|---|
| CALL Option (RISKS) | $29.22 | $20.00 | $40.70 |
| Price Change | | −$9.22 | $11.57 |
| Percent Change | | −31.56% | 39.58% |

One (1) year or 365 days into the allotted five (5) year time period, company ABC announces they are fully liquidating the company, paying the shareholders $120 for each share of stock they own. According to the current known process for the handling of options in a full liquidation scenario, the option holder would exercise his option, purchasing the stock at $100 and then immediately selling that stock for $120. The option holder would realize a loss of $9.22 per share, or $922 for the 100 shares, as he would gain $20 per share in proceeds after paying $29.22 per share for the call option. This example illustrates the problem existing in the current treatment of derivative contracts. The option holder paid the $29.22 per share in order to speculate on the underlying stock over a five (5) year period. Unfortunately for the option holder, a corporate event has curtailed this period of speculation by four (4) years or 1,460 days. The option holder has not received the true benefit of his bargain.

The claimed invention changes the process of distribution in such a scenario to factor in the value of the remaining time period. In accordance with an exemplary embodiment of the claimed invention as illustrated in FIG. 3 and Table 1, the exercise or strike price of the ABC option is discounted to provide the option holder with a distribution that reflects the value of the 1,460 lost days of speculation. Any discounting formula may be used to factor in the 1,460 lost days. In Table 1, the strike price is discounted with the following formula:

$$S = E/(1+r)^y$$

S is the new discounted strike price; for the purposes of this example assume that E, the original strike price, is $100, and r, the risk free rate of interest, is 6%, and y, the remaining period of time on the option contract, is 1460/365 or 4. According to this discount formula the new strike price, $S = 100/(1.06)^4 = $79.21$. According to the readjusted strike price, S, the option holder now gains proceeds equal to the difference between $120 and $79.21, or $40.79 per share, which is $20.79 per share more than the proceeds obtained using the standard treatment of options. These proceeds result in a profit of $40.79–$29.22 per share, or $11.57 per share, or $1,157 for the 100 shares. The inventive treatment of this derivative contract provides the option holder with a return on his investment of 39.58% as opposed to the 31.5% loss of capital experienced with the standard derivative treatment. While the holder of the call option realizes more profit, the writer or seller of the option receives less money for his shares of ABC stock. The option writer or seller now only receives $79.21 per share of ABC stock, which is $20.79 less than the amount he would have received using the standard treatment of option contracts in this scenario. Assuming that the risk free rate of interest is 6%, the option writer or seller, however, could invest his money in short term treasury bonds with the same risk free rate and recoup the full $100 in 1460 days, which is the remaining term of the option contract.

Figure 4:
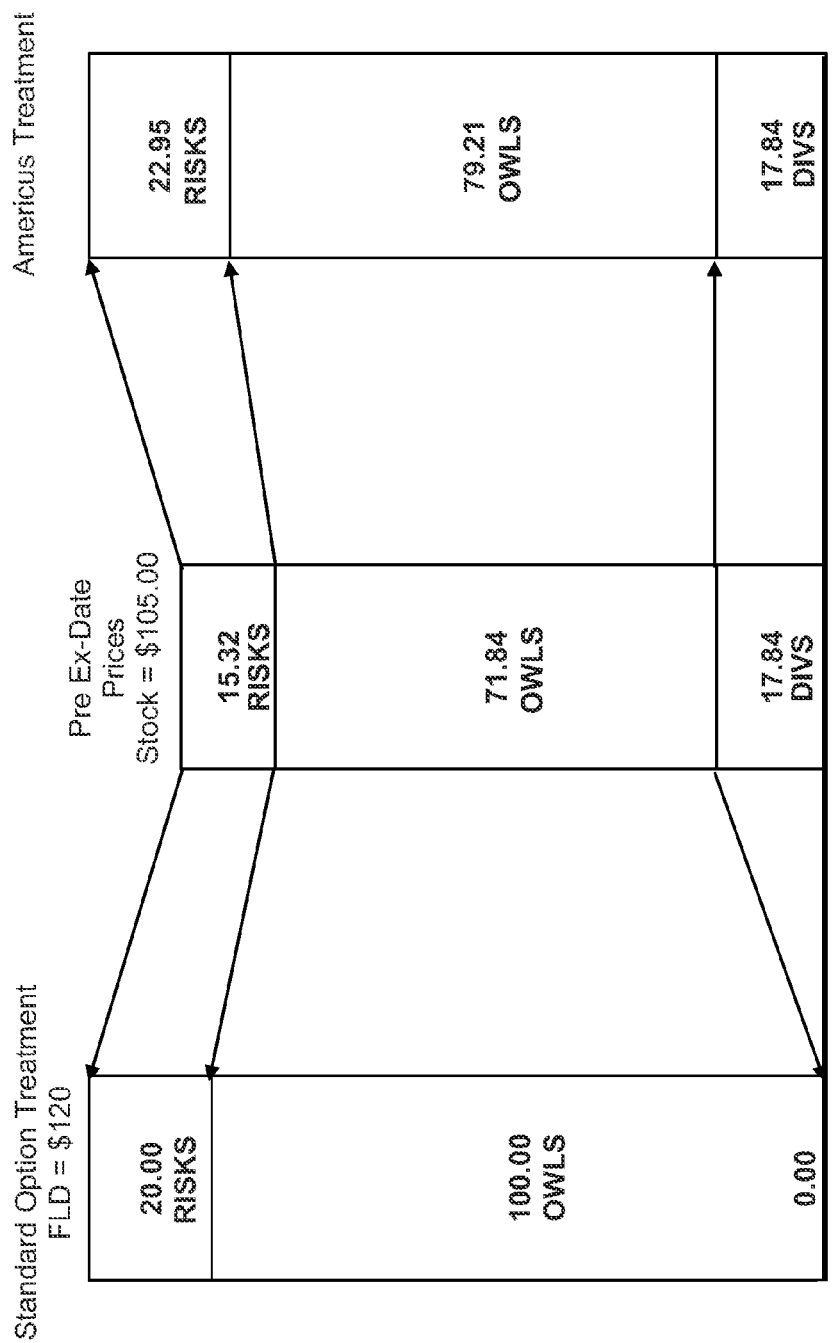
FIG. 4 is a chart illustrating an exemplary embodiment of the inventive process which allocates funds to the DIVS, OWLS and RISKS contracts of a security upon a corporate event triggering a full liquidation.

In accordance with an exemplary embodiment of the claimed invention as illustrated in FIG. 4 and Table 2, the inventive method is applied to a different type of derivative contract. The adjustable derivative contracts are based on the underlying common stock of XYZ corporation, specifically each derivative contract is based on one of the economic interests of two or more shares of the underlying common stock of XYZ corporation. In accordance with an exemplary aspect of the claimed invention, the value of the underlying security is divided and allocated to three adjustable derivative contracts: (1) the adjustable DIVS contract represents the stream of dividends distributed to the holders of each share of XYZ stock; (2) the adjustable RISKS contract represents the speculation on future gains on the value of each share of XYZ stock, which is similar, but not identical, to a call option on XYZ stock; and (3) the adjustable OWLS contract represents the nucleus of a share of XYZ stock, absent the dividend and speculative aspects of that stock, which is similar, but not identical to holding XYZ stock after writing a call option on the dividends and a call option on that stock above a termination claim. Strictly speaking, the adjustable OWLS contract is similar to holding the stock and writing calls on the appreciation and the dividend. It is appreciated that all adjustable OWLS and RISKS contracts can be settled in cash or securities depending on the derivative contract. The concepts and terminology associated with these three derivative contracts based on an underlying stock are fully set forth in commonly owned U.S. Pat. Nos. 5,671,358 and 5,758,097, which are incorporated by reference herein in their entirety.

In accordance with this exemplary embodiment of the claimed invention, investors may purchase one or more of the three adjustable derivative contracts, each adjustable derivative contract being based on one of the three economic interests of a security, as European Style, five (5) year derivative contracts, meaning that the derivative contract would have a five year term and it can only be exercised at the end of this 5 year period. The three adjustable derivative contracts based on three different economic interests of two or more shares/units of a security, respectively, may not be exercised during the 5 year period, but may be freely traded throughout that time period. It is anticipated that the value of three adjustable derivate contracts combined, each based on one of the three economic interests of the underlying security, will closely approximate the market price of the underlying security at any time.

The writer of the adjustable DIVS contract would pay the holder of this derivative contract the dividends that are distributed on the underlying security throughout the 5 year period. The value and price of this derivative will approach zero (0) by the end of the 5 year term. The price of the adjustable DIVS derivative contract is always based on the remaining expected dividend distribution for the XYZ stock for that 5 year term.

The writer of the adjustable RISKS contract would deliver to the holder of this derivative contract, at the end of the 5 year term, stock or cash worth the amount that the price of XYZ stock at the time is above the termination claim, which is similar but not identical to a strike price. This would represent a settlement of differences between the termination claim and the current market price of the stock at termination. The adjustable RISKS contract would state whether the settlement of the differences is paid in cash or securities. If at the end of 5 years, shares of XYZ are trading at or below the termination claim, then the holder of the adjustable RISKS contract receives nothing. If, however, the price of XYZ stock is trading above the termination claim at the end of the five year period, the holder of the adjustable RISKS contract receives the difference between the market price of XYZ stock and the termination claim. The termination claim is set at the beginning of the 5 year period, and the adjustable RISKS contract is priced accordingly. During the five year period, the adjustable RISKS contract can be priced similar to a call option.

The adjustable OWLS contract is what remains of a share of XYZ stock after the adjustable DIVS contract and adjustable RISKS contract have been removed. The holder of this derivative contract at the end of the 5 year period receives the price of the underlying XYZ share up to the termination claim. If the market price of XYZ shares at the end of the 5 year period is equal to or greater than the termination claim, then the holder of the OWLS contract is paid an amount equal to the termination claim, paid in either underlying security or cash pursuant to the terms of the derivative contract. If XYZ's market price is below the termination claim at the end of the 5 year period, then the holder of the adjustable OWLS contract receives the value of the full price of the stock in either underlying security or cash pursuant to the terms of the derivative contract.

It is appreciated that the value of the common stock can be further divided into four (4) or more adjustable derivative contracts. For example, in addition to the adjustable RISKS and DIVS, the OWLS contracts can be further subdivided into levels of appreciation with different termination claims. The adjustable OWLS contract described above can be subdivided into adjustable OWLS1 contract with a termination claim of $50, adjustable OWLS2 contract with a termination claim of $75, and adjustable OWLS3 contract with a termination claim of $100. Once the 5 year period is over, the holders of (i) adjustable OWLS1 contract would receive the market price of XYZ up to the $50 termination claim; (ii) adjustable OWLS2 contract would receive any appreciation of XYZ common stock over $50 up to the $75 termination claim; and (iii) adjustable OWLS3 contract would receive any appreciation of XYZ common stock over $75 up to the $100 termination claim. The market would price these derivative contracts according to the relative risk of the derivative contract with the adjustable OWLS1 contract being the least risky of the three adjustable OWLS contracts and the adjustable OWLS3 contract being the most risky of the three adjustable OWLS contracts. The concepts described herein for the three adjustable derivative contracts, each based on one of the economic interests of the underlying security, can just as easily be applied to four or more adjustable derivative contracts.

A corporate event, such as the sale of XYZ, triggers a full liquidating dividend of XYZ shares prior to the expiration of the 5 year period for the holders of the adjustable DIVS, RISKS, and OWLS contracts. The sale occurs 365 days into the 5 year term (assuming 365 days in a year for simplicity of calculations) leaving 1460 days (4.0 years) on the term of the adjustable DIVS, RISKS, and OWLS contracts. For the purposes of this example, assume that the termination claim (TC) was set at $100, the risk free rate, r, is 6.00%, and the annual dividend is $5. Under a standard-like option treatment, the DIVS contract holders would receive nothing from such a distribution. Additionally, the RISKS contract holders would not get the benefit of the full five year period to allow the stock to appreciate as they had anticipated. The OWLS contract holders would benefit unfairly as they would receive the full benefit of their bargain without having to wait the full 5 year term. If the liquidating dividend was $120, the three adjustable derivative contracts would receive the following distributions: DIVS contract holders would receive $0, RISKS contract holders would receive $20, and the OWLS contract holders would receive $100. That is, the termination claim is not adjusted to reflect the lost period of time for the adjustable RISKS contract holders and the adjustable DIVS contract holders simple lose their stream of income.

In accordance with an exemplary embodiment of the claimed invention, the discount rate can be one of i) the interest rate on Treasury Securities maturing approximately at the termination date of the DORS derivative contracts; ii) the internal rate of return of the OWLS based on the Average OWLS Price, where OWLS is an option with limited stock derivative contract representing a nucleus of said at least two shares of the underlying security and Average OWLS price is the average price of the OWLS over a predetermined number of days before the announcement of the corporate event; iii) any other predetermined rate established by the exchange, sponsor or issuer of the derivative contracts.

In accordance with an exemplary embodiment of the claimed invention as illustrated in FIG. 4 and Table 2, a full liquidating dividend would result in the following distributions that account for the time value of money: first, the adjustable DIVS contract holder would receive the present value of the remaining expected nominal dividend payments, which, for this example, is equal to $17.84. Second, the termination claim is discounted to represent its present value considering that there are 4.0 years remaining on the term of the derivatives. Using the 6.00% risk free rate, the original TC of $100 is reset to its present value of $79.21. Accordingly, holders of the adjustable OWLS contract receive $79.21 per share. Finally, the holders of the adjustable RISKS contract receive all of the remaining distribution, which for this example is $22.95 per share. That is, the claimed invention adjusts one or more exemplary terms of the derivative contract but not limited to the following: the termination claim, the settlement or termination date, the underlying securities, the distribution or payment.

TABLE 2

FULL LIQUIDATING DIVIDEND
(Company XYZ trading in OWLS, RISKS and DIVS)

Assumed Stock Parameters and Derivative Contract Prices

| | | | |
|---|---|---|---|
| Dividend | $ 5.00 | Stock Price | $105.00 |
| Days to Term | 1460 | RISKS Price | 15.32 |
| Years to Term | 4 | OWLS Price | 71.84 |
| Termination Claim | $ 100.00 | DIVS Price (b) | 17.84 |
| Standard Deviation | 16% | | |
| Risk Free Rate (a) | 6% | | |

(a) The interest rate on Treasury obligations matched to the RISKS termination date.
(b) Based on the risk free rate and assuming no dividend growth
1. The DIVS receives the present value of the remaining nominal dividends discounting at the risk free rate.
2. The Termination Claim is adjusted by taking the present value of the original TC discounted at the risk free rate.
3. Payment to the OWLS is the lesser of the adjusted TC or the liquidating dividend reduced by the amount paid to the DIVS.
4. The RISKS receives any money left after the OWLS and DIVS are paid.

| | | |
|---|---|---|
| DIVS Payment | $17.84 | Present Value of the expected future dividends discounted at the risk free rate |
| Adjusted Term Claim | $79.21 | PV of the Termination Claim discounted at the risk free rate 79.21 = 100/[(1 + .06)^4] |

| | | | | |
|---|---|---|---|---|
| Liquidating Dividend | $ 120.00 | $130.00 | $140.00 | $150.00 |
| Value of DIVS | $ 17.84 | $ 17.84 | $ 17.84 | $ 17.84 |
| Liq Div less DIVS | $ 102.16 | $112.16 | $122.16 | $132.16 |
| Value of OWLS | $ 79.21 | $ 79.21 | $ 79.21 | $ 79.21 |
| Value of RISKS | $ 22.95 | $ 32.95 | $ 42.95 | $ 52.95 |

Figure 5:
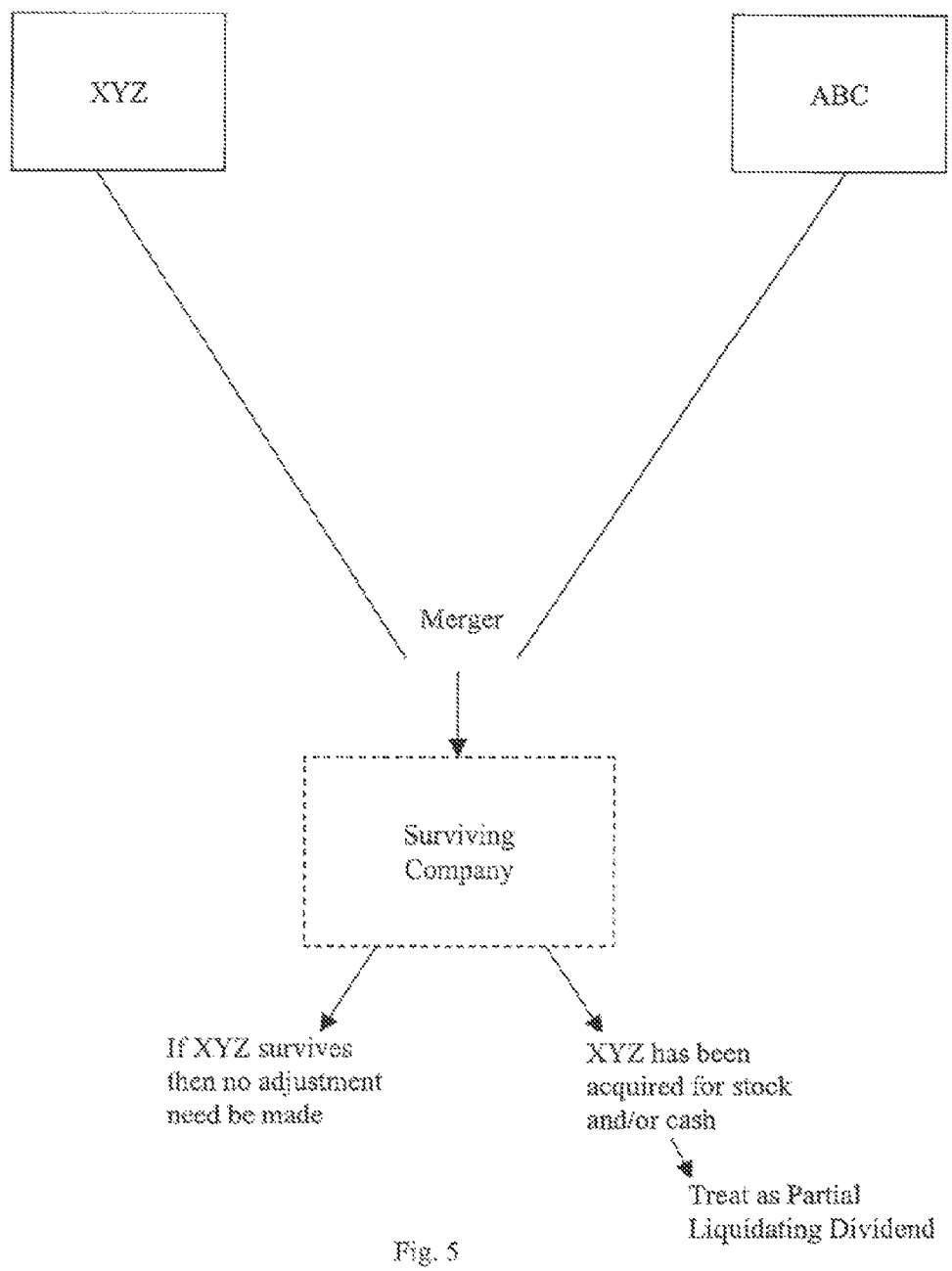
FIG. 5 is a chart illustrating an exemplary embodiment of the inventive process which allocates funds to the different derivative contracts of a security upon a corporate event triggering a merger.

In accordance with an exemplary embodiment of the claimed invention as illustrated in FIG. 5 and Table 3, XYZ corporation participates in a merger with ABC corporation. If XYZ is the surviving corporation, then no distributions are made and no adjustments need to be made to the adjustable derivative contracts based on the stock of XYZ corporation. If the XYZ is not the surviving company, then a few options arise. One example is that no distributions are made, and the surviving company's stock simply replaces the common stock as the underlying assets for the adjustable derivative contracts. Another example involves the acquisition of XYZ for stock and cash. For this latter example, the adjustable derivative contracts will be adjusted as for a partial liquidating dividend as discussed in relation to Table 5 herein, with the remaining stock underlying the adjustable DIVS, OWLS and RISKS contracts until the end of the contract period, i.e., 5 years.

TABLE 3

MERGERS
(Company XYZ trading in OWLS, RISKS and DIVS)

1. If the surviving company is the issuer of the derivative contracts, no adjustments for the DIVS, OWLS and RISKS will be made.
2. If the issuer is not the surviving company, the stock of the acquiring company will underlie the derivative contracts.
3. If the original company is acquired for stock and cash, the derivative contracts will be adjusted as for a partial liquidating dividend for the cash portion.
4. The DIVS holder will receive the dividends paid by the company after the merger.

In accordance with an exemplary embodiment of the claimed invention as illustrated in Table 4, XYZ issues a special dividend, which is not part of the stream of dividends anticipated by the holders of XYZ common stock. XYZ, whose shares at the time are trading on the market at $105/share, issues a special dividend of $10.00 with 1460 days remaining in the term of the derivative contracts.

TABLE 4

SPECIAL DIVIDEND
(Company XYZ trading in OWLS, RISKS and DIVS)

1. The DIVS receives a portion of any special dividend representing up to 3% of the underlying stock price, or a percentage specified in the contract, of the stock's price on the ex-date of the special dividend. This payment may be reduced to reflect the time left in the contract.
2. The OWLS receives any remaining portion of the special dividend.
3. The value of the special dividend, reduced by the payment to the DIVS, is adjusted to be its future value discounted at the risk free rate.
4. The Termination Claim is reduced by the future value from 3.

| | | |
|---|---|---|
| Special Dividend | $10.00 | |
| DIVS Payment | $ 3.15 | Based on the amount of the special dividend and 3.0% of the stock's price $3.15 = $105 * .030 |
| Payment to OWLS | $ 6.85 | Portion of the special dividend payable to OWLS $6.85 = $10.00 − $3.15 |
| Future Value of Dividend | $ 8.65 | Future Value of the SD, reduced by the DIVS payment, discounted by the risk free rate $8.65 = ($10.00 − $3.15) * (1 + 0.06) ^ (1460/365) |
| Adjusted Term Claim | $91.35 | Term Claim reduced by the future value of the special dividend. This value is used to determine the payout to the OWLS and RISKS on the termination date $91.35 = $100.00 − $8.65 |

Expected Ex-date Values as the Result of a Special Dividend

| | | |
|---|---|---|
| Stock | $95.00 | Stock price reduced by the special dividend |
| RISKS | $12.72 | Calculated (Black & Scholes) using $95 stock price, 91.35 adjusted Termination Claim and $5.00 dividend |
| DIVS | $17.84 | PV of 4 years of nominal dividends ($5.00) discounted at the risk free rate |
| OWLS | $64.44 | Residual value based on the new stock, RISKS and DIVS |
| OWLS IRR | 9.12% | OWLS IRR going from 6$4.44 to $91.35 in 1460 days |

Again, one possible treatment of special dividends would result in the following distributions: the adjustable DIVS and RISKS contract holders would receive $0 from this distribution, the adjustable OWLS contract holders would receive the full $10/share, and the termination claim would remain unchanged. In alternative treatments, the adjustable DIVS contract holder receives the entire special dividend; or the adjustable DIVS and OWLS contract holders, each receives a portion of the special dividend based on a predetermined formula.

In accordance with an exemplary embodiment of the claimed invention, each derivative contract is based on 2 or more shares/units of the underlying security. In the following example the prices below are per underlying share/unit per contract.

In accordance with an exemplary embodiment of the claimed invention as illustrated in Table 4, the distributions are made to the adjustable derivative contract holders in the context of the time value of money. Assume for the purposes of this example that the termination claim was set at $100, the adjustable OWLS contract is currently trading at $71.84. The adjustable DIVS contract holder receives the portion of the special dividend representing a specified percentage of the current market price of the underlying equity security up to the amount of the special dividend. This percentage may be determined by several methods, including, but not limited to the following: ADC may set the percentage prior to the issuance of the adjustable DIVS contract; ADC may set it upon the issuance of the special dividend; a special committee within the clearing corporation may be in charge of setting it; it may be the function of another variable such as the risk free rate of return; it may be standardized by the financial industry. In this example, assume that the adjustable DIVS contract receive a distribution from the special dividend up to 3% of the stock's price, which in this case is $105*0.03 or $3.15. If the special dividend is less than 3% of the stock's price, then only the adjustable DIVS contract holder participates in the distribution and no other adjustments need be made. In this example, the special dividend is $10.00, so the adjustable DIVS contract holder gets a $3.15/share distribution, and there remains $6.85 to be distributed. The adjustable OWLS contract holder receives the remainder of the special dividend, in this case $6.85. The termination claim would then be adjusted to reflect the current $6.85 distribution to the adjustable OWLS contract holders. The termination claim can be adjusted by reducing it by the future value of the $6.85 distribution using the 6.0% risk free rate for the adjustable OWLS contract, which equals $6.85*(1+0.06)^{4.0}$ or $8.65. In accordance with an exemplary embodiment of the claimed invention, the discount rate can be one of i) the interest rate on Treasury Securities maturing approximately at the termination date of the DORS derivative contracts; ii) the internal rate of return of the OWLS based on the Average OWLS Price, where OWLS is an option with limited stock derivative contract representing a nucleus of said at least two shares of the underlying security and Average OWLS price is the average price of the OWLS over a predetermined number of days before the announcement of the corporate event; iii) any other predetermined rate established by the exchange, sponsor or issuer of the derivative contracts. The termination claim is reduced to $100−$8.65 or $91.35 to fairly reflect the future value of the current distribution to the adjustable OWLS contract holders, which acts like an early withdrawal of their initial investment for the adjustable OWLS contract holders. The adjustable RISKS contract holders are no longer penalized upon XYZ's distribution of special dividends, allowing them to recoup the loss of capital to the corporation, which is likely to be reflected in a lower stock price, through a properly reduced termination claim.

In accordance with an exemplary embodiment of the claimed invention as illustrated in Table 5, XYZ corporation issues a partial liquidating dividend (PLD). First, the adjustable DIVS contract holders will receive the present value of any reduction in the dividends paid on the underlying stock. The PLD will then be adjusted by deducting any payments to the adjustable DIVS contract holders. The adjusted PLD will be denoted as $PLD_n$. Then the present value of the termination claim (TC) is compared to the $PLD_n$. If the present value of the TC is greater than the $PLD_n$, then (i) the TC is adjusted by deducting from it the future value of the $PLD_n$, which is based on the potential IRR of the current market price of the adjustable OWLS contract needed to reach the TC upon expiration of the derivative; and (ii) the adjustable OWLS contract holders are paid the full $PLD_n$. If, however, the $PLD_n$ is greater than or equal to the present value of the termination claim, then (i) the adjustable OWLS contract holders get paid the present value of the termination claim, meaning that they have been paid on their investment and no longer have an interest in the underlying asset; (ii) the termination claim is adjusted to zero; (iii) the adjustable RISKS contract holders get paid the remainder of the $PLD_n$, which is the $PLD_n$ reduced by the present value of the TC; and (iv) any future liquidating dividends are paid to the adjustable RISKS and DIVS contract holders.

TABLE 5

PARTIAL LIQUIDATING DIVIDEND
(Company XYZ trading in OWLS, RISKS and DIVS)

1. DIVS will receive the present value of the reduction, if any, in the dividend paid on the underlying stock.
2. Adjusted PLD (PLDn) = PLD reduced by the payment to the DIVS
3. If the PLDn is less than the present value of the Termination Claim
   i. Adj. TC equals the original TC reduced by the future value of the PLDn discounted at the risk free rate.
   ii. The OWLS are paid the adjusted PLD.
4. If the PLDn is greater than or equal to the present value of the termination claim.
   i. The OWLS get paid the present value of the termination claim (PV(TC)).
   ii. The Termination Claim is adjusted to zero.
   iii. The RISKS get the remaining portion of the adjusted PLD (PLDn − PV(TC)).

TABLE 5-continued

PARTIAL LIQUIDATING DIVIDEND
(Company XYZ trading in OWLS, RISKS and DIVS)

iv. Any future liquidating dividends will be paid to the RISKS and DIVS, the OWLS having been completely paid.

| | | |
|---|---|---|
| Value of PLD | $40.00 | |
| New Stock Dividend | $ 3.50 | Announced by the company |
| Reduction in Dividend | $ 1.50 | $1.50 = $5.00 − $3.50, the reduction in the annual dividend due to the PLD |
| Payment to DIVS | $ 5.35 | $5.35 = PV of $1.50 for 4 years discounted at 6.0% |
| Adjusted PLD | $34.65 | Portion of PLD due to the OWLS $34.65 = $40.00 − $5.35 |
| FV of Adjusted PLD | $43.74 | Future value of the PLD discounted at the risk free rate. $43.74 = $34.65 * [1 + .06 ^ (1460/365)] |
| Adjusted Term Claim | $56.26 | Termination Claim reduced by the future value of the PLD. This value is used to determine the payout to the RISKS and OWLS at the termination date. $56.26 = $100 − $43.74 |

Expected Ex-date Values as a Result of a Partial Liquidating Dividend

| | | |
|---|---|---|
| Stock | $65.00 | Pre ex-date stock price reduced by the amount of the PLD |
| RISKS | $11.13 | Black & Scholes RISKS price using $65.00 stock price, $56.26 adjusted Termination Claim and the $3.50 new dividend |
| DIVS | $12.49 | PV of 4 years of $3.50 annual nominal dividends discounted at the risk free rate |
| OWLS | $41.38 | New residual value of the OWLS $41.38 = $65.00 − ($11.13 + $12.49) |
| OWLS IRR | 7.98% | OWLS IRR going from $41.38 to $56.26 in 4 years |

In accordance with an exemplary embodiment of the claimed invention as illustrated in Table 5, with 1460 days (4.0 years) left in the term of the adjustable derivative contracts, XYZ issues a PLD of $40.00. The annual dividend was decreased from $5 to $3.50. As in previous embodiments, the TC is $100 and the risk free rate of return is 6.00%. Under one possible distribution, the adjustable DIVS and RISKS contract holders would have received $0 while the adjustable OWLS contract holders would have received the full $40/share and the termination claim would have been reduced by $40 (TC=$100−$40=$60).

In accordance with an exemplary embodiment of the claimed invention as illustrated in Table 5, the PLD would have resulted in the following distributions and adjustments to the adjustable derivative contracts. First, the adjustable DIVS contract holders would have received a payment of $5.35 per share, which is the present value of the $1.50 loss in the annual dividend for the next 4.0 years, to make up for the decrease in dividend payments resulting from this PLD. The PLD is then adjusted via a reduction of $5.35, leaving a $PLD_n$ of $34.65. This value is then be compared with the present value of the TC, which is equal to $100/(1.06)^{4.0}$ or $79.21. As the present value of the TC of $79.21 is greater than the $PLD_n$ of $34.65, the adjustable OWLS contract holders receive the full adjusted partial liquidation distribution of $34.65 per share of stock underlying the OWLS contract. In addition, the TC must be adjusted by a deduction of the future value of the $PLD_n$ discounted by the risk free rate of 6.0%. The future value of the $PLD_n$ is equal to $34.65*(1.06)^{4.0}$ or $43.74, and the adjusted TC should now be $56.26. Hence, at the end of the five year period, if the stock price is trading at any price above $56.26, that excess will belong to the adjustable RISKS contract holders while the adjustable OWLS contract holders would only receive $56.26 per share at that time, in addition to their current $34.65 distribution.

Corporate Events Involving a Cash Distribution

In accordance with an exemplary embodiment of the claimed invention as illustrated in Table 6, the Cash Distributions as result of corporate events are made to the adjustable derivative contract holders in the context of the time value of money. If only adjustable OWLS and RISKS are trading, then the processor calculates the present value of the Termination Claim (PVTC) based on the time to termination of the contract discounted at the risk free rate to allocate the Cash Distribution between the adjustable OWLS and RISKS holders/owners. If the Cash Distribution is less than or equal to the present value of the Termination Claim (PVTC), then the entire Cash Distribution is paid to the adjustable OWLS holder/owner and the adjustable RISKS holder/owner will receive no portion of the Cash Distribution. The original Termination Claim is reduced by the future value of the Cash Distribution based on the risk free rate to obtain the adjusted Termination Claim. However, if the Cash Distribution is greater than the present value of the Termination Claim, then the adjustable OWLS holder gets a portion of the Cash Distribution equal to the present value of the Termination Claim (PVTC). The Termination Claim is adjusted to zero and the adjustable RISKS holder gets the remaining portion of the Cash Distribution (Cash Distribution minus PVTC).

If all three adjustable DORS derivative contracts are trading, then the adjustable DIVS holder/owner gets an amount up to the sum of (i) five percent (5.0%) of the Cash Distribution multiplied by the number of days remaining in the Contract divided by the total number of days in the contract (DTM/total days of contract); and (ii) the present value of the reduction of the dividend, if any, paid on the underlying stock over the remainder of the term of the contract. It is appreciated that the maximum payment to the DIVS holder/owner is the value of the Cash Distribution. The Cash Distribution is reduced by the payment to the adjustable DIVS holder/owner to obtain an Adjusted Cash Distribution (Cashn) to be allocated between the adjustable OWLS and RISKS holders/owners. The processor calculates the present value of the Termination Claim (PVTC) based on the time to termination of the contract discounted at the risk free rate. If the Adjusted Cash Distribution (Cashn) is less than or equal to the present value of the Termination Claim (PVTC), then the entire Adjusted Cash Distribution is paid to the adjustable OWLS holder/owner and the adjustable RISKS holder/owner will receive no portion of the Cash Distribution. The original Termination Claim is reduced by the future value of the Adjusted Cash Distribution based on the risk free rate to obtain the adjusted Termination Claim. However, if the Adjusted Cash Distribution (Cashn) is greater than the present value of the Termination Claim, then the adjustable OWLS holder gets a portion of the Adjusted Cash Distribution (Cashn) up to the present value of the Termination Claim (PVTC). The Termination Claim is adjusted to zero and the adjustable RISKS holder gets the remaining portion of the Adjusted Cash Distribution (Cahsn minus PVTC).

TABLE 6

CORPORATE EVENTS INVOLVING A CASH DISTRIBUTION
(Trading in OWLS, RISKS and DIVS)
(Contract based on 100 shares; 6% Risk Free Rate)

In the case of no DIVS trading, then skip steps 1-2 and start with step 3:
1. The payment to the DIVS is the sum up to:
   a. 5.0% of the cash distribution multiplied by the number of days remaining in the contract divided by the total number of days in the contract (DTM/Total days of contract); and
   b. The present value of the reduction of the dividend, if any, paid on the underlying stock over the reminder of the term of the contract.
2. Adjusted Cash (Cashn) = Cash distribution reduced by the payment to the DIVS.
3. Calculate the present value of the Termination Claim (PVTC) based on the time to termination of the contract discounted at the risk free rate.
4. If the Cashn is less than or equal to the present value of the Termination Claim:
   a. The adjusted TC equals the original TC reduced by the future value of the Cashn based on the risk free rate; and
   b. The OWLS is paid adjusted Cash (Cashn).
5. If the Cashn is greater than the present value of the Termination Claim:
   a. The OWLS get paid the present value of the Termination Claim (PVTC);
   b. The termination claim is adjusted to zero; and
   c. The RISKS get paid the remaining portion of the adjusted Cash (Cashn − PVTC)

As illustrated in Table 7, the exemplary corporate event involves a Cash Distribution of $40 in the form of a partial liquidating dividend (PLD) with assumed stock parameters and derivative contract prices as set forth therein and announcement of a new stock dividend of $3.50 by the company. The annual dividend is reduced by $1.50 ($5.00−$3.50) due to the extraordinary cash payment. In accordance with an exemplary embodiment of the claimed invention, the adjustable DIVS holder/owner gets an amount up to the sum of (i) five percent (5.0%) of the Cash Distribution multiplied by the number of days remaining in the Contract divided by the total number of days in the contract (DTM/total days of contract) or $1.60=$50*0.05*(1460/1825); and (ii) the present value of the reduction of the dividend, if any, paid on the underlying stock over the remainder of the term of the contract or $5.35=PV of $1.50 for 4 years discounted at 6.0%. The Cash Distribution is reduced by the payment to the adjustable DIVS holder/owner to obtain an Adjusted Cash Distribution ($33.05=$40.00−$6.95) to be allocated between the adjustable OWLS and RISKS holders/owners. The processor calculates the present value of the Termination Claim (PVTC) based on the time to termination of the contract discounted at the risk free rate or $79.21=$100/[(1+0.06)^(1460/365)].

Since the Adjusted Cash Distribution of $33.05 is less than the present value of the Termination Claim (PVTC=$79.21), the entire Adjusted Cash Distribution of $33.05 is paid to the adjustable OWLS holder/owner and the adjustable RISKS holder/owner will receives no portion of the Cash Distribution. The processor reduces the original Termination Claim by the future value of the Adjustable Cash Distribution to the adjustable OWLS holder/owner based on the risk free rate (or $41.72=$33.05*[(1+0.06)^(1460/365)]) to obtain the Adjusted Termination Claim of $58.28=$100−$41.72. That is, the Adjusted Termination Claim is obtained by reducing the Termination Claim by the future value of the payment to the adjustable OWLS holder/owner and the payment of the Cash Distribution is made to the OWLS holder/owner to make up for the decrease in the Termination Claim. The Adjusted Termination Claim is used to determine the payout to the adjustable OWLS and RISKS holders/owners at the termination date.

Termination Claim (PVTC) based on the time to termination of the contract discounted at the risk free rate to allocate the Adjusted Cash Distribution (which equals the Cash Distribution because there is no DIVS in this example) between the adjustable OWLS and RISKS holders/owners. The present value of the Termination Claim (PVTC) is $79.21=$100/[(1+0.06)^(1460/365)]. Since the Adjusted Cash Distribution of $40 is less than the present value of the Termination Claim (PVTC=$79.21), the entire Adjusted Cash Distribution of $40 is paid to the adjustable OWLS holder/owner and the adjustable RISKS holder/owner will receives no portion of the Cash Distribution. The processor reduces the original Termination Claim by the future value of the Adjustable Cash Distribution to the adjustable OWLS holder/owner based on the risk free rate (or $50.50=$40*[(1+0.06)^(1460/365)]) to obtain the Adjusted Termination Claim of $49.50=$100−$50.50. That is, the Adjusted Termination

TABLE 7

PARTIAL LIQUIDATING DIVIDEND
(Trading in OWLS, RISKS and DIVS; 6% Risk Free Rate)

Assumed Stock Parameters and Derivative Contract Prices

| | | | |
|---|---|---|---|
| Dividend | $ 5.00 | Stock Price | $105.00 |
| Days to Term | 1460 | RISKS Price (b) | $ 15.32 |
| Years to Term | 4 | OWLS Price | $ 71.84 |
| Termination Claim | $ 100.00 | DIVS Price (c) | $ 17.84 |
| Standard Deviation | 16% | | |
| Risk Free Rate (a) | 6% | | |

(a) The interest rate on Treasury obligations matched to the RISKS termination date.
(b) RISKS pricing based on Black/Scholes formula.
(c) Based on the risk free rate and assuming no dividend growth

| | | |
|---|---|---|
| Cash Distribution | $40.00 | |
| New Stock Dividend | $ 3.50 | Announced by the company |
| Reduction in Dividend | $ 1.50 | $1.50 = $5.00 − $3.50, the reduction in the annual dividend due to the extraordinary cash payment |
| Payment to DIVS | $ 6.95 | |
| i. Portion of Cash | $ 1.60 | $1.60 = $40*.05*(1460/1825) |
| ii. PV of Div decrease | $ 5.35 | $5.35 = PV of $1.50 for 4 years discounted at 6.0% |
| PV of Term Claim | $79.21 | $79.21 = $100/[(1 + .06)^(1460/365)] |
| Adjusted Cash | $33.05 | Cash less payment to DIVS ($33.05 = $40 − $6.95) |
| Payment to OWLS | $33.05 | Portion of Cash due to OWLS to make up for the decrease in the Termination Claim ($33.05 = Adjusted Cash) |
| FV of Payment to OWLS | $41.72 | Future value of the OWLS payment discounted at the risk free rate. $41.72 = $33.05 * [1 + .06 ^ (1460/365)] |
| Adjusted Term Claim | $58.28 | Termination Claim reduced by the future value of the payment to the OWLS. This value is used to determine the payout to the OWLS and RISKS at the termination date. ($58.28 = $100 − $41.72) |

Expected Ex-date Values as a Result of the Cash Distribution

| | | |
|---|---|---|
| Stock | $65.00 | Ex-date stock price ($65 = $105 − $40) |
| RISKS | $10.13 | Black & Scholes RISKS price using $65.00 stock price, $58.28 adjusted Termination Claim and the $3.50 new dividend |
| DIVS | $12.49 | PV of 4 years of $3.50 annual nominal dividends discounted at the risk free rate |
| OWLS | $42.38 | Residual value of the OWLS $42.38 = $65.00 − ($10.13 + $12.49) |
| OWLS IRR (a) | 8.29% | OWLS IRR going from $42.38 to $58.28 in 4 years |

(a) Investing in more OWLS with the received cash raises the original investment back to 8.62% IRR As illustrated in Table 8, the exemplary corporate event involves a Cash Distribution of $40 in the form of a partial liquidating dividend (PLD) with assumed stock parameters and derivative contract prices as set forth therein. Also, it is assumed that only adjustable OWLS and RISKS are trading. In accordance with an exemplary embodiment of the claimed invention, the processor calculates the present value of the Termination Claim (PVTC) based on the time to termination of the contract discounted at the risk free rate to allocate the Adjusted Cash Distribution between the adjustable OWLS and RISKS holders/owners. The present value of the Termination Claim is obtained by reducing the Termination Claim by the future value of the payment to the adjustable OWLS holder/owner and the payment of the Cash Distribution is made to the OWLS holder/owner to make up for the decrease in the Termination Claim. The Adjusted Termination Claim is used to determine the payout to the adjustable OWLS and RISKS holders/owners at the termination date.

TABLE 8

PARTIAL LIQUIDATING DIVIDEND
(Trading in OWLS and RISKS; 6% Risk Free Rate)

Assumed Stock Parameters and Derivative Contract Prices

| | | | |
|---|---|---|---|
| Dividend | $ 0.00 | Stock Price | $105.00 |
| Days to Term | 1460 | RISKS Price (b) | $ 29.22 |
| Years to Term | 4 | OWLS Price | $ 75.78 |
| Termination Claim | $ 100.00 | DIVS Price | N/A |
| Standard Deviation | 16% | | |
| Risk Free Rate (a) | 6% | | |

(a) The interest rate on Treasury obligations matched to the RISKS termination date.
(b) RISKS pricing based on Black/Scholes formula.

| | | |
|---|---|---|
| Cash Distribution | $40.00 | |
| New Stock Dividend | N/A | No DIVS trading |
| Reduction in Dividend | N/A | |
| Payment to DIVS | N/A | No DIVS trading |
| i. Portion of Cash | N/A | |
| ii. PV of Div decrease | N/A | |
| PV of Term Claim | $79.21 | $79.21 = $100/[(1 + .06)^(1460/365)] |
| Adjusted Cash | $40.00 | Cash less payment to DIVS ($40 = $40 − $0) |
| Payment to OWLS | $40.00 | Portion of Cash due to OWLS to make up for the decrease in the Termination Claim ($40 = Adjusted Cash) |
| FV of Payment to OWLS | $50.50 | Future value of the OWLS payment discounted at the risk free rate. $50.50 = $40 * [1 + .06^(1460/365)] |
| Adjusted Term Claim | $49.50 | Termination Claim reduced by the future value of the payment to the OWLS. This value is used to determine the payout to the OWLS and RISKS at the termination date. ($49.50 = $100 − $50.50) |

Expected Ex-date Values as a Result of the Cash Distribution

| | | |
|---|---|---|
| Stock | $65.00 | Ex-date stock price ($65 = $105 − $40) |
| RISKS | $26.43 | Black & Scholes RISKS price using $65.00 stock price, $49.50 adjusted Termination Claim and no dividend |
| OWLS | $38.57 | Residual value of the OWLS $38.57 = $65.00 − $26.43 |
| OWLS IRR (a) | 6.44% | OWLS IRR going from $38.57 to $49.50 in 4 years |

(a) Investing in more OWLS with the received cash raises the original investment back to 8.62% IRR As illustrated in Table 9, the exemplary corporate event involves a Cash Distribution of $10 in the form of a special dividend with assumed stock parameters and derivative contract prices as set forth therein and announcement of a new stock dividend of $5 by the company. The annual dividend is not reduced by the company. In accordance with an exemplary embodiment of the claimed invention, the adjustable DIVS holder/owner gets an amount up to the sum of (i) five percent (5.0%) of the Cash Distribution multiplied by the number of days remaining in the Contract divided by the total number of days in the contract (DTM/total days of contract) or $0.40=$10*0.05*(1460/1825); and (ii) the present value of the reduction of the dividend is zero because there was no change in dividend. The Cash Distribution is reduced by the payment to the adjustable DIVS holder/owner to obtain an Adjusted Cash Distribution ($9.60=$10.00−$0.40) to be allocated between the adjustable OWLS and RISKS holders/owners. The processor calculates the present value of the Termination Claim (PVTC) based on the time to termination of the contract discounted at the risk free rate or $79.21=$100/[(1+0.06)^(1460/365)]. Since the Adjusted Cash Distribution of $9.60 is less than the present value of the Termination Claim (PVTC=$79.21), the entire Adjusted Cash Distribution of $9.60 is paid to the adjustable OWLS holder/owner and the adjustable RISKS holder/owner will receives no portion of the Cash Distribution. The processor reduces the original Termination Claim by the future value of the Adjustable Cash Distribution to the adjustable OWLS holder/owner based on the risk free rate (or $12.12=$9.60* [(1+0.06)^(1460/365)]) to obtain the Adjusted Termination Claim of $87.88=$100−$12.12. That is, the Adjusted Termination Claim is obtained by reducing the Termination Claim by the future value of the payment to the adjustable OWLS holder/owner and the payment of the Cash Distribution is made to the OWLS holder/owner to make up for the decrease in the Termination Claim. The Adjusted Termination Claim is used to determine the payout to the adjustable OWLS and RISKS holders/owners at the termination date.

TABLE 9

SPECIAL DIVIDEND
(Trading in OWLS, RISKS and DIVS; 6% Risk Free Rate)

Assumed Stock Parameters and Derivative Contract Prices

| | | | |
|---|---|---|---|
| Dividend | $ 5.00 | Stock Price | $105.00 |
| Days to Term | 1460 | RISKS Price (b) | $ 15.32 |
| Years to Term | 4 | OWLS Price | $ 71.84 |
| Termination Claim | $ 100.00 | DIVS Price (c) | $ 17.84 |

TABLE 9-continued

SPECIAL DIVIDEND
(Trading in OWLS, RISKS and DIVS; 6% Risk Free Rate)

| | | |
|---|---|---|
| Standard Deviation | 16% | |
| Risk Free Rate (a) | 6% | |

(a) The interest rate on Treasury obligations matched to the RISKS termination date.
(b) RISKS pricing based on Black/Scholes formula.
(c) Based on the risk free rate and assuming no dividend growth

| | | |
|---|---|---|
| Cash Distribution | $10.00 | |
| New Stock Dividend | $ 5.00 | Announced by the company |
| Reduction in Dividend | $ 0.00 | No change in dividend |
| Payment to DIVS | $ 0.40 | |
| i.   Portion of Cash | $ 0.40 | $0.40 = $10*.05*(1460/1825) |
| ii.  PV of Div decrease | N/A | no change in dividend |
| PV of Term Claim | $79.21 | $79.21 = $100/[(1 + .06)^(1460/365)] |
| Adjusted Cash | $ 9.60 | Cash less payment to DIVS ($9.60 = $10 − $0.40) |
| Payment to OWLS | $ 9.60 | Portion of Cash due to OWLS to make up for the decrease in the Termination Claim ($9.60 = Adjusted Cash) |
| FV of Payment to OWLS | $12.12 | Future value of the OWLS payment discounted at the risk free rate. $12.12 = $9.60 * [1 + .06^(1460/365)] |
| Adjusted Term Claim | $87.88 | Termination Claim reduced by the future value of the payment to the OWLS. This value is used to determine the payout to the OWLS and RISKS at the termination date. ($87.88 = $100 − $12.12) |

Expected Ex-date Values as a Result of the Cash Distribution

| | | |
|---|---|---|
| Stock | $95.00 | Ex-date stock price ($95 = $105 − $10) |
| RISKS | $13.85 | Black & Scholes RISKS price using $95.00 stock price, $87.88 adjusted Termination Claim and the $5.00 new dividend |
| DIVS | $17.84 | PV of 4 years of $5.00 annual nominal dividends discounted at the risk free rate |
| OWLS | $63.31 | Residual value of the OWLS $63.31 = $95.00 − ($13.85 + $17.84) |
| OWLS IRR (a) | 8.54% | OWLS IRR going from $63.31 to $87.88 in 4 years |

(a) Investing in more OWLS with the received cash raises the original investment back to 8.62% IRR As illustrated in Table 10, the exemplary corporate event involves a Cash Distribution of $10 in the form of a special dividend with assumed stock parameters and derivative contract prices as set forth therein. No dividend is paid by the company. Also, it is assumed that only adjustable OWLS and RISKS are trading. In accordance with an exemplary embodiment of the claimed invention, the processor calculates the present value of the Termination Claim (PVTC) based on the time to termination of the contract discounted at the risk free rate to allocate the Adjusted Cash Distribution (which equals the Cash Distribution because there is no DIVS in this example) between the adjustable OWLS and RISKS holders/owners. The present value of the Termination Claim (PVTC) is $79.21=$100/[(1+0.06)^(1460/365)]. Since the Adjusted Cash Distribution of $10 is less than the present value of the Termination Claim (PVTC=$79.21), the entire Adjusted Cash Distribution of $10 is paid to the adjustable OWLS holder/owner and the adjustable RISKS holder/owner will receives no portion of the Cash Distribution. The processor reduces the original Termination Claim by the future value of the Adjusted Cash Distribution paid to the adjustable OWLS holder/owner based on the risk free rate (or $12.62=$10*[(1+ 0.06)^(1460/365)]) to obtain the Adjusted Termination Claim of $87.38=$100−$12.62. That is, the Adjusted Termination Claim is obtained by reducing the Termination Claim by the future value of the payment to the adjustable OWLS holder/owner and the payment of the Cash Distribution is made to the OWLS holder/owner to make up for the decrease in the Termination Claim. The Adjusted Termination Claim is used to determine the payout to the adjustable OWLS and RISKS holders/owners at the termination date.

TABLE 10

SPECIAL DIVIDEND
(Trading in OWLS and RISKS; 6% Risk Free Rate)

Assumed Stock Parameters and Derivative Contract Prices

| | | | |
|---|---|---|---|
| Dividend | $ 0.00 | Stock Price | $105.00 |
| Days to Term | 1460 | RISKS Price (b) | $ 29.22 |
| Years to Term | 4 | OWLS Price | $ 75.78 |
| Termination Claim | $ 100.00 | DIVS Price | N/A |
| Standard Deviation | 16% | | |
| Risk Free Rate (a) | 6% | | |

(a) The interest rate on Treasury obligations matched to the RISKS termination date.
(b) RISKS pricing based on Black/Scholes formula.

| | | |
|---|---|---|
| Cash Distribution | $10.00 | |
| New Stock Dividend | N/A | No DIVS trading |
| Reduction in Dividend | N/A | |
| Payment to DIVS | N/A | No DIVS trading |

TABLE 10-continued

SPECIAL DIVIDEND
(Trading in OWLS and RISKS; 6% Risk Free Rate)

| | | |
|---|---|---|
| i. Portion of Cash | N/A | |
| ii. PV of Div decrease | N/A | |
| PV of Term Claim | $79.21 | $79.21 = $100/[(1 + .06)^(1460/365)] |
| Adjusted Cash | $10.00 | Entire $10 Cash Distribution |
| Payment to OWLS | $10.00 | Portion of Cash due to OWLS to make up for the decrease in the Termination Claim ($10 = Adjusted Cash) |
| FV of Payment to OWLS | $12.62 | Future value of the OWLS payment discounted at the risk free rate. $12.62 = $10.00 * [1 + .06 ^ (1460/365)] |
| Adjusted Term Claim | $87.38 | Termination Claim reduced by the future value of the payment to the OWLS. This value is used to determine the payout to the OWLS and RISKS at the termination date. ($87.38 = $100 − $12.62) |

Expected Ex-date Values as a Result of the Cash Distribution

| | | |
|---|---|---|
| Stock | $95.00 | Ex-date stock price ($95 = $105 − $10) |
| RISKS | $28.36 | Black & Scholes RISKS price using $95.00 stock price, $87.38 adjusted Termination Claim and no dividend |
| OWLS | $66.64 | Residual value of the OWLS $66.64 = $95.00 − $28.36 |
| OWLS IRR (a) | 7.01% | OWLS IRR going from $66.64 to $87.38 in 4 years |

(a) Investing in more OWLS with the received cash raises the original investment back to 8.62% IRR As illustrated in Table 11, the exemplary corporate event involves a Cash Distribution of $120 in the form of a full liquidating dividend with assumed stock parameters and derivative contract prices as set forth therein. The stock dividend is now eliminated because the company is being liquidated. In accordance with an exemplary embodiment of the claimed invention, the adjustable DIVS holder/owner gets an amount up to the sum of: (i) five percent (5.0%) of the Cash Distribution multiplied by the number of days remaining in the Contract divided by the total number of days in the contract (DTM/total days of contract) or $4.80=$120*0.05*(1460/1825); and (ii) the present value of the reduction of the dividend, if any, paid on the underlying stock over the remainder of the original term of the contract or $17.84=PV of $5.50 for 4 years discounted at 6.0%. The Cash Distribution is reduced by the payment to the adjustable DIVS holder/owner to obtain an Adjusted Cash Distribution ($97.36=$120.00−$22.64) to be allocated between the adjustable OWLS and RISKS holders/owners. The processor calculates the present value of the Termination Claim (PVTC) based on the time to termination of the contract discounted at the risk free rate or $79.21=$100/[(1+0.06)^(1460/365)]. Since the Adjusted Cash Distribution of $97.36 is greater than the present value of the Termination Claim (PVTC=$79.21), the Adjusted Cash Distribution of $97.36 is allocated between the adjustable OWLS and RISKS holders/owners. The adjustable OWLS holder/owner gets paid a portion of the Adjusted Cash Distribution equal to the present value of the Termination Claim (PVTC) or $79.21, thereby compensating the OWLS holder/owner for the decrease in the Termination Claim. The processor reduces the Termination Claim to zero since the OWLS holder/owner has been fully compensated. The RISKS holder/owner gets the remainder of the Adjusted Cash Distribution or $18.15=$97.36−$79.21.

TABLE 11

FULL LIQUIDATING DIVIDEND
(Trading in OWLS, RISKS and DIVS; 6% Risk Free Rate)

Assumed Stock Parameters and Derivative Contract Prices

| | | | | |
|---|---|---|---|---|
| Dividend | $ | 5.00 | Stock Price | $105.00 |
| Days to Term | | 1460 | RISKS Price (b) | $ 15.32 |
| Years to Term | | 4 | OWLS Price | $ 71.84 |
| Termination Claim | $ | 100.00 | DIVS Price (c) | $ 17.84 |
| Standard Deviation | | 16% | | |
| Risk Free Rate (a) | | 6% | | |

(a) The interest rate on Treasury obligations matched to the RISKS termination date.
(b) RISKS pricing based on Black/Scholes formula.
(c) Based on the risk free rate and assuming no dividend growth

| | | |
|---|---|---|
| Cash Distribution | $ | 120.00 |
| New Stock Dividend | $ | 0.00 No future dividend, company is being liquidated |
| Reduction in Dividend | $ | 5.00 $5.00 = $5.00 − $0.00, the reduction in annual dividend due to the extraordinary cash payment |
| Payment to DIVS | $ | 22.64 |
| i. Portion of Cash | $ | 4.80 $4.80 = $120*.05*(1460/1825) |
| ii. PV of Div decrease | $ | 17.84 $17.84 = PV of $5.00 for 4 years discounted at 6.0% |
| PV of Term Claim | $ | 79.21 $79.21 = $100/[(1 + .06)^(1460/365)] |
| Adjusted Cash | $ | 97.36 Cash less payment to DIVS ($97.36 = $120 − $22.64); Adjusted Cash is greater than PVTC |
| Payment to OWLS | $ | 79.21 Portion of Cash due to OWLS to make up for the decrease in the Termination Claim ($79.21 = PVTC) |

TABLE 11-continued

FULL LIQUIDATING DIVIDEND
(Trading in OWLS, RISKS and DIVS; 6% Risk Free Rate)

| | | |
|---|---|---|
| Adjusted Term Claim | $ 0.00 | Termination Claim reduced to $0.00 |
| Payment to RISKS | $18.15 | RISKS get the remainder of the Adjusted Cash ($18.15 = $97.36 − $79.21) |

As illustrated in Table 12, the exemplary corporate event involves a Cash Distribution of $120 in the form of a full liquidating dividend with assumed stock parameters and derivative contract prices as set forth therein. No dividend is paid by the company. Also, it is assumed that only adjustable OWLS and RISKS are trading. In accordance with an exemplary embodiment of the claimed invention, the processor calculates the present value of the Termination Claim (PVTC) based on the time to termination of the contract discounted at the risk free rate to allocate the Adjusted Cash Distribution (which equals the Cash Distribution because there is no DIVS in this example) between the adjustable OWLS and RISKS holders/owners. The present value of the Termination Claim (PVTC) is $79.21=$100/[(1+0.06)^(1460/365)]. Since the Adjusted Cash Distribution of $120 is greater than the present value of the Termination Claim (PVTC=$79.21), the Adjusted Cash Distribution of $120 is allocated between the adjustable OWLS and RISKS holders/owners. The adjustable OWLS holder/owner gets paid a portion of the Adjusted Cash Distribution equal to the present value of the Termination Claim (PVTC) or $79.21, thereby compensating the OWLS holder/owner for the decrease in the Termination Claim. The processor reduces the Termination Claim to zero since the OWLS holder/owner has been fully compensated. The RISKS holder/owner gets the remainder of the Adjusted Cash Distribution or $40.79=$120.00−$79.21.

Turning now to Table 13, in accordance with an exemplary embodiment of the claimed invention, the Cash Distributions as result of corporate events are made to the adjustable derivative contract holders in the context of the time value of money. If only adjustable OWLS and RISKS are trading, then the processor calculates the average price of the OWLS over a predetermined number of days, e.g., 2, 3 or 5 days, determined by the sponsor, CC or OCC before the announcement of the corporate action or event ("Average OWLS Price"). If the Cash Distribution is less than or equal to the Average OWLS Price, then the entire Cash Distribution is paid to the adjustable OWLS holder/owner and the adjustable RISKS holder/owner receives no portion of the Cash Distribution. However, if the Cash Distribution is greater than the Average OWLS Price, then the adjustable OWLS holder gets a portion of the Cash Distribution equal to the Average OWLS Price and the adjustable RISKS holder gets the remaining portion of the Cash Distribution (Cash Distribution minus Average OWLS Price). If the corporate event is a full liquidating dividend, then the Termination Claim is reduced or adjusted to zero. It is appreciated that the Termination Claim can never be reduced below zero, that is, the Adjusted Termination Claim cannot be less than zero. In all other corporate events resulting in cash distribution, the Termination Claim is reduced by the future value of the payment to the OWLS (i.e., the OWLS' portion of the Cash Distribution) discounted at

TABLE 12

FULL LIQUIDATING DIVIDEND
(Trading in OWLS and RISKS; 6% Risk Free Rate)

Assumed Stock Parameters and Derivative Contract Prices

| | | | |
|---|---|---|---|
| Dividend | $ 0.00 | Stock Price | $105.00 |
| Days to Term | 1460 | RISKS Price (b) | $ 29.22 |
| Years to Term | 4 | OWLS Price | $ 75.78 |
| Termination Claim | $ 100.00 | DIVS Price | N/A |
| Standard Deviation | 16% | | |
| Risk Free Rate (a) | 6% | | |

(a) The interest rate on Treasury obligations matched to the RISKS termination date.
(b) RISKS pricing based on Black/Scholes formula.

| | | |
|---|---|---|
| Cash Distribution | $120.00 | |
| New Stock Dividend | N/A | No DIVS trading |
| Reduction in Dividend | N/A | |
| Payment to DIVS | N/A | No DIVS trading |
| i. Portion of Cash | N/A | |
| ii. PV of Div decrease | N/A | |
| PV of Term Claim | $ 79.21 | $79.21 = $100/[(1 + .06)^(1460/365)] |
| Adjusted Cash | $120.00 | Entire $120 Cash Distribution; Adjusted Cash is greater than PVTC |
| Payment to OWLS | $ 79.21 | Portion of Cash due to OWLS to make up for the decrease in the Termination Claim ($79.21 = PVTC) |
| Adjusted Term Claim | $ 0.00 | Termination Claim reduced to $0.00 |
| Payment to RISKS | $ 40.79 | RISKS get the remainder of the Adjusted Cash ($40.79 = $120.00 − $79.21) | the OWLS internal rate of return ("IRR") to the original Termination Claim. At termination of the DORS contract (i.e., OWLS and RISKS contract), the OWLS and RISKS holders/owners get cash or stock based on the Adjusted Termination Claim.

If all three adjustable DORS derivative contracts are trading, then the adjustable DIVS holder/owner receives an amount up to the present value of the reduction of the dividend, if any, paid on the underlying stock over the remainder of the term of the contract, discounted at the risk free rate. In accordance with an aspect of the claimed invention, if the corporate event is a special dividend, the DIVS holders also receive an amount equal to the special dividend multiplied by the average dividend yield on the underlying stock over a predetermined period, such as last six months, last year, last three years, etc. It is appreciated that the maximum payment to the DIVS holder/owner is the value of the Cash Distribution. The Cash Distribution is reduced by the payment to the adjustable DIVS holder/owner to obtain an Adjusted Cash Distribution (Cashn) to be allocated between the adjustable OWLS and RISKS holders/owners. The processor calculates the average price of the OWLS over a predetermined number of days, e.g., 2, 3 or 5 days, as determined by the sponsor, CC or OCC before the announcement of the corporate action or event ("Average OWLS Price"). If the Adjusted Cash Distribution (Cashn) is less than or equal to the Average OWLS Price, then the entire Adjusted Cash Distribution is paid to the adjustable OWLS holder/owner and the adjustable RISKS holder/owner receives no portion of the Cash Distribution. However, if the Adjusted Cash Distribution is greater than the Average OWLS Price, then the adjustable OWLS holder gets a portion of the Adjusted Cash Distribution (Cashn) equal to the Average OWLS Price and the adjustable RISKS holder gets the remaining portion of the Adjusted Cash Distribution (Cashn minus Average OWLS Price). If the corporate event is a full liquidating dividend, then the termination claim is reduced or adjusted to zero. In all other corporate events resulting in cash distribution, the termination claim is reduced by the future value of the payment to the OWLS (i.e., the OWLS' portion of the Cash Distribution) discounted at the OWLS IRR to the original Termination Claim. At termination of the DORS contract (i.e., OWLS and RISKS contract), the OWLS and RISKS holders/owners get cash or stock based on the adjusted termination claim.

As illustrated in Table 14, the exemplary corporate event involves a Cash Distribution of $40 in the form of a partial liquidating dividend (PLD) with assumed stock parameters and derivative contract prices as set forth therein and announcement of a new stock dividend of $3.50 by the company. The annual dividend is reduced by $1.50 ($5.00−$3.50) due to the extraordinary cash payment. In accordance with an exemplary embodiment of the claimed invention, the adjustable DIVS holder/owner receives the present value of the reduction of the dividend, if any, paid on the underlying stock over the remainder of the term of the contract or $5.94=PV of $1.50 for 4 years (or 1460 days) discounted at the risk free rate of 0.50%. The Cash Distribution is reduced by the payment to the adjustable DIVS holder/owner to obtain an Adjusted Cash Distribution ($34.06=$40.00−$5.94) to be allocated between the adjustable OWLS and RISKS holders/owners. Since the Adjusted Cash Distribution of $34.06 is less than the Average OWLS Price of $78.88, the entire Adjusted Cash Distribution of $34.06 is paid to the adjustable OWLS holder/owner and the adjustable RISKS holder/owner receives no portion of the Cash Distribution. The processor reduces the original Termination Claim by the future value of the payment to the adjustable OWLS holder/owner discounted at the OWLS internal rate of return (IRR) (or $43.18=$34.06*[(1+0.0611)^(1460/365)]) to obtain the Adjusted Termination Claim of $56.82=$100−$43.18. That is, the Adjusted Termination Claim is obtained by reducing the Termination Claim by the future value of the payment to the adjustable OWLS holder/owner and the payment of the Cash Distribution is made to the OWLS holder/owner to make up for the decrease in the Termination Claim. The Adjusted Termination Claim is used to determine the payout to the adjustable OWLS and RISKS holders/owners at the termination date.

TABLE 13

CORPORATE EVENTS INVOLVING A CASH DISTRIBUTION
(Trading in OWLS, RISKS and DIVS)
(Contract based on 100 shares; 0.5% Risk Free Rate)

In the case of no DIVS trading, then skip step 1 and start with step 2:
1. The payment to the DIVS is the present value of the reduction of the dividend, if any, paid on the underlying stock over the reminder of the term of the contract, discounted at the risk free rate.
2. Adjusted Cash (Cashn) = Cash distribution reduced by the payment to the DIVS.
3. OWLS receive the Adjusted Cash (Cashn) up to the Average OWLS Price (average price of OWLS over predetermined number days before the announcement of the corporate event).
4. RISKS receive the remaining portion of the Adjusted Cash (Cashn), if any, after the payment to OWLS (Cashn − Average OWLS Price).
5. For full liquidating dividend, the Termination Claim is reduced to zero.
6. For all other cash distribution event, the Termination Claim is reduced by the future value of the payment to the OWLS discounted at the OWLS IRR to the original termination claims.

TABLE 14

PARTIAL LIQUIDATING DIVIDEND
(Trading in OWLS, RISKS and DIVS; 0.5% Risk Free Rate)

Assumed Stock Parameters and Derivative Contract Prices

| | | | |
|---|---|---|---|
| Dividend | $ 5.00 | Stock Price | $105.00 |
| Days to Term | 1460 | RISKS Price (b) | $6.32 |
| Years to Term | 4 | OWLS Price (d) | $78.88 |
| Termination Claim | $ 100.00 | OWLS IRR | 6.11% |
| Standard Deviation | 16% | DIVS Price (c) | $19.80 |
| Risk Free Rate (a) | 0.5% | | |

(a) The interest rate on Treasury obligations matched to a contract's termination date.
(b) RISKS pricing based on Black/Scholes formula.
(c) Based on the risk free rate and assuming no dividend growth
(d) OWLS priced as the residual of the stock price less the DIVS and RISKS
($78.88 = $105.00 − $6.32 − $19.80)

| | | |
|---|---|---|
| Cash Distribution | $ 40.00 | |
| New Stock Dividend | $ 3.50 | Announced by the company |
| Reduction in Dividend | $ 1.50 | 1.50 = 5.00 − 3.50, the reduction in the annual dividend due to the extraordinary cash payment |
| Payment to DIVS | $ 5.94 | PV of $1.50 discounted at 0.5% over 1460 years (4 years) |
| Adjusted Cash | $ 34.06 | Cash less payment to DIVS ($34.06 = $40 − $5.94) |
| Payment to OWLS | $ 34.06 | Portion of Cash due to OWLS ($34.06 = Adjusted Cash) |
| FV of Payment to OWLS | $ 43.18 | Future value of the OWLS payment discounted at the OWLS IRR to the Termination Claim. $43.18 = $34.06 * [1 + 0.0611 ^ (1460/365)] |
| Adjusted Term Claim | $ 56.82 | Termination Claim reduced by the future value of the payment to the OWLS. This value is used to determine the payout to the OWLS and RISKS at the termination date. ($56.82 = $100 − $43.18) |

Expected Ex-date Values as a Result of the Cash Distribution

| | | |
|---|---|---|
| Stock | $65.00 | Ex-date stock price ($65 = $105 − $40) |
| RISKS | $8.18 | Black & Scholes RISKS price using $65.00 stock price, $56.82 adjusted Termination Claim and the $3.50 new dividend |
| DIVS | $13.86 | PV of 4 years of $3.50 annual nominal dividends discounted at the risk free rate |
| OWLS | $42.96 | Residual value of the OWLS $42.96 = $65.00 − ($8.18 + $13.86) |
| OWLS IRR | 7.24% | OWLS IRR going from $42.96 to $56.82 in 4 years |

As illustrated in Table 15, the exemplary corporate event involves a Cash Distribution of $40 in the form of a partial liquidating dividend (PLD) with assumed stock parameters and derivative contract prices as set forth therein. Also, it is assumed that only adjustable OWLS and RISKS are trading. Since the Cash Distribution of $40.00 is less than the Average OWLS Price of $88.31, the entire Cash Distribution of $40.00 is paid to the adjustable OWLS holder/owner and the adjustable RISKS holder/owner receives no portion of the Cash Distribution. In accordance with an exemplary embodiment of the claimed invention, the processor reduces the original Termination Claim by the future value of the payment to the adjustable OWLS holder/owner discounted at the OWLS internal rate of return (IRR) (or $45.29=$40.00*[(1+0.0316)^(1460/365)]) to obtain the Adjusted Termination Claim of $54.71=$100−$45.29. That is, the Adjusted Termination Claim is obtained by reducing the Termination Claim by the future value of the payment to the adjustable OWLS holder/owner and the payment of the Cash Distribution is made to the OWLS holder/owner to make up for the decrease in the Termination Claim. The Adjusted Termination Claim is used to determine the payout to the adjustable OWLS and RISKS holders/owners at the termination date.

TABLE 15

PARTIAL LIQUIDATING DIVIDEND
(Trading in OWLS and RISKS; 0.5% Risk Free Rate)

Assumed Stock Parameters and Derivative Contract Prices

| | | | |
|---|---|---|---|
| Dividend | N/A | Stock Price | $105.00 |
| Days to Term | 1460 (4 years) | RISKS Price (b) | $16.69 |
| Termination Claim | $100.00 | OWLS Price (d) | $88.31 |
| Standard Deviation | 16% | OWLS IRR | 3.16% |
| Risk Free Rate (a) | 0.5% | DIVS Price (c) | N/A |

(a) The interest rate on Treasury obligations matched to a contract's termination date.
(b) RISKS pricing based on Black/Scholes formula.
(c) No DIVS contract trade since the stock doesn't pay any dividends
(d) OWLS priced as the residual of the stock price less the RISKS
($88.31 = $105.00 − $16.69)

TABLE 15-continued

PARTIAL LIQUIDATING DIVIDEND
(Trading in OWLS and RISKS; 0.5% Risk Free Rate)

1. OWLS receive the Cash Distribution up to the Average OWLS Price (average price of OWLS over predetermined number days before the announcement of the corporate event).
2. RISKS receive the remaining portion of the Cash Distribution, if any, after the payment to OWLS.
3. The Termination Claim is reduced by the future value of the payment to the OWLS discounted at the OWLS IRR to the original termination claims.

| | | |
|---|---|---|
| Cash Distribution | $40.00 | |
| New Stock Dividend | N/A | No DIVS trading; No dividends paid by the company |
| Reduction in Dividend | N/A | |
| Adjusted Cash | $40.00 | Entire $40 Cash Distribution |
| Payment to OWLS | $40.00 | Portion of Cash due to OWLS ($40 Cash Distribution) |
| FV of Payment to OWLS | $45.29 | Future value of the OWLS payment discounted at the OWLS IRR to the Termination Claim. $45.29 = $40.00 * [1 + 0.0611 ^ (1460/365)] |
| Adjusted Term Claim | $54.71 | Termination Claim reduced by the future value of the payment to the OWLS. This value is used to determine the payout to the OWLS and RISKS at the termination date. ($54.71 = $100 − $45.29) |

Expected Ex-date Values as a Result of the Cash Distribution

| | | |
|---|---|---|
| Stock | $65.00 | Ex-date stock price ($65 = $105 − $40) |
| RISKS | $14.54 | Black & Scholes RISKS price using $65.00 stock price, $54.71 adjusted Termination Claim and no dividend |
| OWLS | $50.46 | Residual value of the OWLS $50.46 = $65.00 − $14.54 |
| OWLS IRR | 2.04% | OWLS IRR going from $50.46 to $54.71 in 4 years |

As illustrated in Table 16, the exemplary corporate event involves a Cash Distribution of $10 in the form of a special dividend with assumed stock parameters and derivative contract prices as set forth therein and the stock dividend remains unchanged at $5. In accordance with an exemplary embodiment of the claimed invention, the adjustable DIVS holder/owner receives no portion of the Cash Distribution (or special dividend) because there was no reduction in the dividend. Alternatively, the adjustable DIVS holder/owner receives an amount equal to the Cash Distribution (or special dividend) multiplied by the average dividend yield on the underlying sock over the last year (e.g., 5%). The Cash Distribution is reduced by the payment to the adjustable DIVS holder/owner to obtain an Adjusted Cash Distribution ($10.00=$10.00−$0.00) to be allocated between the adjustable OWLS and RISKS holders/owners. Since the Adjusted Cash Distribution of $10.00 is less than the Average OWLS Price of $78.88, the entire Adjusted Cash Distribution of $10.00 is paid to the adjustable OWLS holder/owner and the adjustable RISKS holder/owner receives no portion of the Cash Distribution. The processor reduces the original Termination Claim by the future value of the payment to the adjustable OWLS holder/owner discounted at the OWLS internal rate of return (IRR) (or $12.68=$10.00*[(1+0.0611)^(1460/365)]) to obtain the Adjusted Termination Claim of $87.32=$100−$12.68. That is, the Adjusted Termination Claim is obtained by reducing the Termination Claim by the future value of the payment to the adjustable OWLS holder/owner and the payment of the Cash Distribution is made to the OWLS holder/owner to make up for the decrease in the Termination Claim. The Adjusted Termination Claim is used to determine the payout to the adjustable OWLS and RISKS holders/owners at the termination date.

TABLE 16

SPECIAL DIVIDEND
(Trading in OWLS, RISKS and DIVS; 0.5% Risk Free Rate)

Assumed Stock Parameters and Derivative Contract Prices

| | | | |
|---|---|---|---|
| Dividend | $ 5.00 | Stock Price | $105.00 |
| Days to Term | 1460 | RISKS Price (b) | $6.32 |
| Years to Term | 4 | OWLS Price (d) | $78.88 |
| Termination Claim | $ 100.00 | OWLS IRR | 6.11% |
| Standard Deviation | 16% | DIVS Price (c) | $19.80 |
| Risk Free Rate (a) | 0.5% | | |

(a) The interest rate on Treasury obligations matched to a contract's termination date.
(b) RISKS pricing based on Black/Scholes formula.
(c) Based on the risk free rate and assuming no dividend growth
(d) OWLS priced as the residual of the stock price less the DIVS and RISKS ($78.88 = $105.00 − $6.32 − $19.80)

| | | |
|---|---|---|
| Cash Distribution | $10.00 | |
| New Stock Dividend | $ 5.00 | Dividend same as the old dividend |
| Reduction in Dividend | $ 0.00 | No change in dividend; company did not reduce the dividend |
| Payment to DIVS | $ 0.00 | No reduction in the dividend |
| Adjusted Cash | $10.00 | Cash less payment to DIVS ($10 = $10 − $0.00) |

TABLE 16-continued

SPECIAL DIVIDEND
(Trading in OWLS, RISKS and DIVS; 0.5% Risk Free Rate)

| | | |
|---|---|---|
| Payment to OWLS | $10.00 | Portion of Cash due to OWLS ($10.00 = Adjusted Cash) |
| FV of Payment to OWLS | $12.68 | Future value of the OWLS payment discounted at the OWLS IRR to the Termination Claim. $12.68 = $10.00 * [1 + 0.0611 ^ (1460/365)] |
| Adjusted Term Claim | $87.32 | Termination Claim reduced by the future value of the payment to the OWLS. This value is used to determine the payout to the OWLS and RISKS at the termination date. ($87.32 = $100 − $12.68) |

Expected Ex-date Values as a Result of the Cash Distribution

| | | |
|---|---|---|
| Stock | $95.00 | Ex-date stock price ($95 = $105 − $10) |
| RISKS | $7.68 | Black & Scholes RISKS price using $95.00 stock price, $87.32 adjusted Termination Claim and the $5.00 dividend |
| DIVS | $19.80 | PV of 4 years of $5.50 annual nominal dividends discounted at the risk free rate |
| OWLS | $67.52 | Residual value of the OWLS $67.52 = $95.00 − ($7.68 + $19.80) |
| OWLS IRR | 6.64% | OWLS IRR going from $67.52 to $87.32 in 4 years |

As illustrated in Table 17, the exemplary corporate event involves a Cash Distribution of $10 in the form of a special dividend with assumed stock parameters and derivative contract prices as set forth therein. No dividend is paid by the company. Also, it is assumed that only adjustable OWLS and RISKS are trading. Since the Cash Distribution of $10.00 is less than the Average OWLS Price of $88.31, the entire Cash Distribution of $10.00 is paid to the adjustable OWLS holder/owner and the adjustable RISKS holder/owner receives no portion of the Cash Distribution. In accordance with an exemplary embodiment of the claimed invention, the processor reduces the original Termination Claim by the future value of the payment to the adjustable OWLS holder/owner discounted at the OWLS internal rate of return (IRR) (or $11.32=$10.00*[(1+0.0316)^(1460/365)]) to obtain the Adjusted Termination Claim of $88.68=$100−$11.32. That is, the Adjusted Termination Claim is obtained by reducing the Termination Claim by the future value of the payment to the adjustable OWLS holder/owner and the payment of the Cash Distribution is made to the OWLS holder/owner to make up for the decrease in the Termination Claim. The Adjusted Termination Claim is used to determine the payout to the adjustable OWLS and RISKS holders/owners at the termination date.

TABLE 17

SPECIAL DIVIDEND
(Trading in OWLS and RISKS; 0.5% Risk Free Rate)

Assumed Stock Parameters and Derivative Contract Prices

| | | | |
|---|---|---|---|
| Dividend | N/A | Stock Price | $105.00 |
| Days to Term | 1460 (4 years) | RISKS Price (b) | $16.69 |
| Termination Claim | $100.00 | OWLS Price (d) | $88.31 |
| Standard Deviation | 16% | OWLS IRR | 3.16% |
| Risk Free Rate (a) | 0.5% | DIVS Price (c) | N/A |

(a) The interest rate on Treasury obligations matched to a contract's termination date.
(b) RISKS pricing based on Black/Scholes formula.
(c) No DIVS contract trade since the stock doesn't pay any dividends
(d) OWLS priced as the residual of the stock price less the RISKS ($88.31 = $105.00 − $16.69)

| | | |
|---|---|---|
| Cash Distribution | $10.00 | |
| New Stock Dividend | N/A | No DIVS trading |
| Reduction in Dividend | N/A | |
| Adjusted Cash | $10.00 | Entire $10 Cash Distribution |
| Payment to OWLS | $10.00 | Portion of Cash due to OWLS to make up for the decrease in the Termination Claim ($10 = Adjusted Cash) |
| FV of Payment to OWLS | $11.32 | Future value of the OWLS payment discounted at the OWLS IRR to the Termination Claim. $11.32 = $10.00 * [1 + 0.0316 ^ (1460/365)] |
| Adjusted Term Claim | $88.68 | Termination Claim reduced by the future value of the payment to the OWLS. This value is used to determine the payout to the OWLS and RISKS at the termination date. ($88.68 = $100 − $11.32) |

Expected Ex-date Values as a Result of the Cash Distribution

| | | |
|---|---|---|
| Stock | $95.00 | Ex-date stock price ($95 = $105 − $10) |
| RISKS | $16.04 | Black & Scholes RISKS price using $95.00 stock price, $88.68 adjusted Termination Claim and no dividend |
| OWLS | $78.96 | Residual value of the OWLS $78.96 = 95.00 − 16.04 |
| OWLS IRR | 2.94% | OWLS IRR going from $78.96 to $88.68 in 4 years |

As illustrated in Table 18, the exemplary corporate event involves a Cash Distribution of $120 in the form of a full liquidating dividend with assumed stock parameters and derivative contract prices as set forth therein. The stock dividend is now eliminated because the company is being liquidated. In accordance with an exemplary embodiment of the claimed invention, the adjustable DIVS holder/owner receives the present value of the reduction of the dividend, if any, paid on the underlying stock over the remainder of the term of the contract or $19.80=PV of $5.00 for 4 years (or 1460 days) discounted at the risk free rate of 0.50%. The Cash Distribution is reduced by the payment to the adjustable DIVS holder/owner to obtain an Adjusted Cash Distribution ($100.20=$120.00−$19.80) to be allocated between the adjustable OWLS and RISKS holders/owners. The processor calculates the average price of the OWLS over a predetermined number of days, e.g., 2, 3 or 5 days, as determined by the sponsor, CC or OCC before the announcement of the corporate action or event ("Average OWLS Price"). Since the Adjusted Cash Distribution of $100.20 is greater than the Average OWLS Price of $78.88, the Adjusted Cash Distribution of $100.20 is allocated between the adjustable OWLS and RISKS holders/owners. The adjustable OWLS holder receives $78.88, the portion of the Adjusted Cash Distribution (Cashn) equal to the Average OWLS Price and the adjustable RISKS holder gets the remaining portion of the Adjusted Cash Distribution (Cashn minus Average OWLS Price) or $21.32=$100.20−$78.88. The processor reduces the Termination Claim to zero since the OWLS holder/owner has been fully compensated.

As illustrated in Table 19, the exemplary corporate event involves a Cash Distribution of $120 in the form of a full liquidating dividend with assumed stock parameters and derivative contract prices as set forth therein. No dividend is paid by the company. Thus, it is assumed that only adjustable OWLS and RISKS are trading. The processor calculates the average price of the OWLS over a predetermined number of days, e.g., 2, 3 or 5 days, as determined by the sponsor, CC or OCC before the announcement of the corporate action or event ("Average OWLS Price"). Since the Adjusted Cash Distribution (Cashn) of $120 is greater than the Average OWLS Price of $88.31, the Adjusted Cash Distribution (Cashn) of $120 is allocated between the adjustable OWLS and RISKS holders/owners. The adjustable OWLS holder gets a portion of the Adjusted Cash Distribution (Cashn) equal to the Average OWLS Price and the adjustable RISKS holder gets the remaining portion of the Adjusted Cash Distribution (Cashn minus Average OWLS Price) or $31.69=$120.00−$88.31. The processor reduces the Termination Claim to zero since the OWLS holder/owner has been fully compensated.

TABLE 18

FULL LIQUIDATING DIVIDEND
(Trading in OWLS, RISKS and DIVS; 0.5% Risk Free Rate)

Assumed Stock Parameters and Derivative Contract Prices

| | | | |
|---|---|---|---|
| Dividend | $ 5.00 | Stock Price | $105.00 |
| Days to Term | 1460 | RISKS Price (b) | $6.32 |
| Years to Term | 4 | OWLS Price (d) | $78.88 |
| Termination Claim | $ 100.00 | OWLS IRR | 6.11% |
| Standard Deviation | 16% | DIVS Price (c) | $19.80 |
| Risk Free Rate (a) | 0.5% | | |

(a) The interest rate on Treasury obligations matched to a contract's termination date.
(b) RISKS pricing based on Black/Scholes formula.
(c) Based on the risk free rate and assuming no dividend growth
(d) OWLS priced as the residual of the stock price less the DIVS and RISKS
($78.88 = $105.00 − $6.32 − $19.80)

| | | |
|---|---|---|
| Cash Distribution | $ 120.00 | |
| New Stock Dividend | $ 0.00 | No future dividend, company is being liquidated |
| Reduction in Dividend | $ 5.00 | $5.00 = $5.00 − $0.00, the reduction in annual dividend due to the extraordinary cash payment |
| Payment to DIVS | $ 19.80 | $19.80 = PV of $5.00 for 4 years discounted at Risk Free Rate of 0.5% |
| Adjusted Cash | $ 100.20 | Cash less payment to DIVS ($100.20 = $120 − $19.80); |
| Payment to OWLS | $ 78.88 | Average price of OWLS over a predetermined number of days prior to the announcement of the corporate event |
| Adjusted Term Claim | $ 0.00 | Termination Claim reduced to $0.00 |
| Payment to RISKS | $ 21.32 | RISKS get the remainder of the Adjusted Cash ($21.32 = $100.20 − $78.88) |

TABLE 19

FULL LIQUIDATING DIVIDEND
(Trading in OWLS and RISKS; 0.5% Risk Free Rate)

Assumed Stock Parameters and Derivative Contract Prices

| | | | |
|---|---|---|---|
| Dividend | N/A | Stock Price | $105.00 |
| Days to Term | 1460 (4 years) | RISKS Price (b) | $16.69 |
| Termination Claim | $100.00 | OWLS Price (d) | $88.31 |
| Standard Deviation | 16% | OWLS IRR | 3.16% |
| Risk Free Rate (a) | 0.5% | DIVS Price (c) | N/A |

(a) The interest rate on Treasury obligations matched to a contract's termination date.
(b) RISKS pricing based on Black/Scholes formula.
(c) No DIVS contract trade since the stock doesn't pay any dividends
(d) OWLS priced as the residual of the stock price less the RISKS
($88.31 = $105.00 − $16.69)

| | | |
|---|---|---|
| Cash Distribution | $120.00 | |
| New Stock Dividend | N/A | No DIVS trading |
| Reduction in Dividend | N/A | |
| Adjusted Cash | $120.00 | Entire $120 Cash Distribution |
| Payment to OWLS | $ 88.31 | Average price of OWLS over a predetermined number of days prior to the announcement of the corporate event |
| Adjusted Term Claim | $ 0.00 | Termination Claim reduced to $0.00 |
| Payment to RISKS | $ 31.69 | RISKS get the remainder of the Adjusted Cash ($31.69 = $120.00 − $88.31) |

Corporate Events Involving a Stock Distribution

In accordance with an exemplary embodiment of the claimed invention as illustrated in Table 20, the Stock Distributions as result of corporate events are made to the adjustable derivative contract holders in the context of the time value of money. Assume for the purposes of this example that the termination claim was set at $100, the risk free rate is 0.5%, the adjustable OWLS contract is currently trading at $78.88, the adjustable DIVS contract is currently trading at $19.80, adjustable RISKS contract is currently trading at $6.32, number of days to termination or number of days remaining in the contract (DTM) is 1460 days, and each adjustable contract is based on 100 shares of security, e.g., common stock.

The adjustable DORS derivative contracts are backed by the shares of the original company, if it survives the corporate event, and additional shares distributed as a result of the corporate event. The adjustable DIVS holder/owner receives the dividend paid on the shares underlying the adjustable DIVS contract as a result of the corporate event. At termination, the value of the underlying stock is computed as the price of each stock times the number of shares of each stock underlying the adjustable DORS derivative contract. The monetary value of the stock received by each adjustable DORS derivative contract is calculated as in a normal termination of the adjustable DORS derivative contract based on the Termination Claim and the value of the underlying stock. The adjustable RISKS holder/owner receives nothing if the value of the adjustable OWLS derivative contract is less than the Termination Claim.

TABLE 20

CORPORATE EVENTS INVOLVING A STOCK DISTRIBUTION
(Trading in OWLS, RISKS and DIVS)
(Contract based on 100 shares)

Assumed Stock Parameters and Derivative Contract Prices

| | | | |
|---|---|---|---|
| Dividend | $ 5.00 | Stock Price | $105.00 |
| Days to Term | 1460 | RISKS Price (b) | 6.32 |
| Years to Term | 4 | OWLS Price | 78.88 |
| Termination Claim | $ 100.00 | DIVS Price (c) | 19.80 |
| Standard Deviation | 16% | Risk Free Rate (a) | 0.5% |

(a) The interest rate on Treasury obligations matched to the RISKS termination date.
(b) RISKS pricing based on Black/Scholes formula.
(c) Based on the risk free rate and assuming no dividend growth
1. The adjustable derivative contract is backed by the shares of the original company, if it survives the corporate event, and the shares distributed as a result of the corporate event.
2. The DIVS receives the dividend paid on the shares underlying the adjustable derivative contract as a result of the corporate event.
3. At termination, the value of the underlying stock is computed as the price of each stock times the number of shares of each stock underlying the adjustable derivative contract.
4. The monetary value of the stock each adjustable derivative contract receives is calculated in a normal termination, based on the termination claim and the combined value calculated in step 3 herein above.
5. At termination, the RISKS and OWLS holders receive pro rata shares of the stock(s) underlying the adjustable derivative contracts.

In accordance with an exemplary embodiment of the claimed invention as illustrated in Table 21, assumed stock parameters and derivative contract prices as set forth in Table 20, XYZ company spins-off a portion of the company to its shareholders, with each original share of the XYZ company getting one share of the spinning XYZ company and a quarter of share of the spun-off ABC company. Upon such an occurrence, the adjustable derivatives are now backed by a combination of both XYZ and ABC shares. XYZ shares have been spun-off so that there is a ¼ share of ABC for every share of XYZ. Accordingly an adjustable derivative contract backed by 100 shares of XYZ is now backed by 100 shares of XYZ and 25 shares of ABC. After the spin-off, assume the XYZ shares trade at a market price of $87.50 while the ABC shares trade at a market price of $50. Relative to overall dollar value, the derivatives are now backed by 87.5% XYZ shares, (100 shares*$87.50)/(100 shares*$87.50+25 shares*$50), and 12.5% ABC shares, (25 shares*$50)/(100 shares*$87.50+25 shares*$50).

For the remainder of the contract term, the adjustable DIVS contract holders receive the stream of dividends from both XYZ and ABC multiplied by the number of shares in the contract for each of these companies, which should be 4 shares of XYZ for every share of ABC.

Upon termination of the adjustable DORS derivative contracts, assume XYZ is trading at the market price of $110/share while ABC trades at the market price of $100/share. An adjustable OWLS contract holder who initially owned 100 shares of XYZ with a Termination Claim of $100, has an adjustable derivative contract that is now backed by $11,000 (100 shares*$110) worth of XYZ stock and $2,500 worth of ABC stock (25 shares*$100), or $13,500 worth of the combined stocks. The adjustable OWLS contract holders, however, are only entitled to $10,000 of the $13,500 based on the original termination claim of $100 with respect to the original 100 pre-spin-off shares of XYZ. Accordingly, at termination of the adjustable OWLS derivative contract, adjustable OWLS contract holders are only entitled to 74.074% ($10,

TABLE 21

SPIN-OFFS AND SPLIT-UPS
(Trading in OWLS, RISKS and DIVS)

| | Original | Post Spin-off Cos. | | Assume ¼ share of ABC company for each |
| --- | --- | --- | --- | --- |
| | Company | XYZ Co | ABC Co | original share of XYZ Co |
| | | On Effective Date: | | |
| Shares/contract | 100 | 100 | 25 | Shares underlying adjustable derivative contract 100 shares of Co XYZ and 25 shares of Co ABC |
| Termination Claim | $ 100.00 | | | Termination Claim on original contract |
| Price/share | $ 100.00 | $ 87.50 | $ 50.00 | $100 = 1.00*87.5 + .25*$50.0 |
| Value/contract | $10,000 | $ 8,750 | $1,250 | share price times shares/contract |
| Relative value | 100.00% | 87.50% | 12.50% | The percentage that each company represents of the original company's pre ex-date value |
| Dividend/share | $ 5.00 | $ 4.00 | $ 4.00 | Announced by companies |
| Dividend/contract | $ 500 | $ 400 | $ 100 | Dividend times number of shares per contract; $400 = $4 * 100; $100 = $4* 25 |
| | | On Termination Date (Contract Settlement): | | |
| Value/share of Combined Cos | $ 135 | $ 110 | $ 100 | Assumed prices for two companies, and combined contract value; $135 = 1.00 * $110 + 0.25 * $100 |
| Value/contract | $13,500 | $11,000 | $2,500 | Price per share times shares/contract |
| OWLS % Combined | | 74.07% | | Value of OWLS derivative contract as a percent of the combined value 74.07% = 10,000/(11,000 + 2,500) |
| OWLS value | $10,000 | $ 8,148.15 | $1,851.85 | Split based on the value of each company $8,148.15 = $11,000 * 74.07% $1,851.85 = $2,500 * 74.07% |
| OWLS shares | | 74 | 18 | Number of shares of XYZ Co. & ABC Co.; 74 = integer part of $8,148.15/$110; 18 = integer part of $1,851.85/$100 |
| OWLS cash | | $ 8.15 | $ 51.85 | Cash in lieu of fractional shares |
| RISKS % Combined | | 25.93% | | Value of RISKS derivative contract as a percent of the combined value 25.93% = ($13,500 − $10,000)/($11,000 + $2,500) |
| RISKS value | $ 3,500 | $ 2,851.85 | $ 648.15 | Split based of the value of each company $2,851.85 = 25.93% * $11,000 $648.15 = 25.93% * $2,500 |
| RISKS shares | | 25 | 6 | Number of shares of XYZ Co. & ABC Co.; 25 = integer part of $2581.85/$110; 6 = integer part of $648.15/$100 |
| RISKS cash | | $ 101.85 | $ 48.15 | Cash in lieu of fractional shares; $101.85 = $2,851.85 − 25 * $110; $48.15 = $648.15 − 6 * $110 |

000/$13,500) of the proceeds from each of XYZ and ABC, which entitles them to $8,148.15 of XYZ proceeds and $1,581.85 of ABC proceeds. The adjustable OWLS contract holders will be paid in the underlying shares of the companies with cash in lieu of fractional shares which translates to a distribution of 74 shares of XYZ stock plus $8.15 and 18 shares of ABC stock plus $51.85. At termination of the adjustable RISKS derivative contract, the adjustable RISKS contract holders would receive the remainder of the proceeds equating to $3,500, which would be a distribution of $2,851.85 of XYZ proceeds (or 25 shares of XYZ plus $101.85) and $648.15 of ABC proceeds (or 6 shares of ABC plus $48.15).

From time to time a corporation that issued the stock underlying the adjustable derivative contracts will announce a stock split, resulting in the issuance of new shares of stock for each existing share. In accordance with an exemplary embodiment of the claimed invention as illustrated in Table 22, the adjustable derivative contracts adjust to account for a three for two stock splits. The holders of the underlying stock getting 1.5 shares of stock for each share she owned before the split is announced. Each investor in the underlying stock will get an additional half share of stock for each original share of stock, resulting in her having 1.5 times as many shares as originally and the price of each share is reduced by 33.33%, which is 1 divided by 1.5. Assuming there is no change in the dividend policy of the corporation, the dividend per share is reduced by 33.33%. This results in the market value of the stock held by investors remaining the same before and after the split. The adjustable derivative contract of the claimed invention and/or the inventive method applied to the adjustable derivative contracts results in each adjustable derivative contract being backed by 1.5 shares for each original share. The adjustable derivative contracts of the claimed invention and/or the inventive method can be applied to any stock split announced by the corporation.

TABLE 22

STOCK SPLIT
3 SHARES FOR 2 SHARES STOCK SPLIT (0.5% RISK FREE RATE)

|  | Pre Split | | | Post Split | | |
| --- | --- | --- | --- | --- | --- | --- |
|  | Shares/Contract | Price | Value | Shares/Contract | Price | Value |
| Common Stock | 100 | $105.00 | $10,500.00 | 150 | $70.00 | $10,500.00 |
| RISKS Contract | 100 | $ 6.32* | $ 632.20 | 150 | $ 6.02* | $ 632.20 |
| OWLS Contract | 100 | $ 78.88* | $ 7,887.60 | 150 | $52.58* | $ 7,887.60 |
| DIVS Contract | 100 | $ 19.80* | $ 1,980.20 | 150 | $13.20* | $ 1,980.20 |
| Annual Stock Dividend |  | $ 5.00 |  |  | $ 3.33 |  |
| Termination Claim |  | $100.00 |  |  | $66.67 |  |

*Rounded to nearest cent.

From time to time a corporation may increase the number of shares each investor in the corporation owns by declaring a stock dividend. As an example, the company may announce a 5.00% stock dividend. This results in each share holder receiving 5 new shares of stock for each 100 shares she owns, thereby increasing her holding to 105 shares for every 100 shares held by her previously. At the same time, the price of the stock will be reduced to reflect the increased number of shares outstanding, typically reducing the price by 1 divided by (one plus the dividend). In the example shown herein, the stock price is reduced to approximately 95.24% of its original value, with its actual price being determined by the market place. In accordance with an exemplary embodiment of the claimed invention as illustrated in Table 23, the adjustable derivative contracts will be underlain by the original number of shares plus the number of shares issued per original underlying share as a result of the stock dividend.

TABLE 23

STOCK DIVIDEND
5.00% STOCK DIVIDEND (0.5% RISK FREE RATE)

|  | Pre Split | | | Post Split | | |
| --- | --- | --- | --- | --- | --- | --- |
|  | Shares/Contract | Price | Value | Shares/Contract | Price | Value |
| Common Stock | 100 | $105.00 | $10,500.00 | 105 | $100.00 | $10,500.00 |
| RISKS Contract | 100 | $ 6.32* | $ 632.20 | 105 | $ 6.02* | $ 632.20 |
| OWLS Contract | 100 | $ 78.88* | $ 7,887.60 | 105 | $ 75.12* | $ 7,887.60 |

TABLE 23-continued

STOCK DIVIDEND
5.00% STOCK DIVIDEND (0.5% RISK FREE RATE)

|  | Pre Split | | | Post Split | | |
| --- | --- | --- | --- | --- | --- | --- |
|  | Shares/Contract | Price | Value | Shares/Contract | Price | Value |
| DIVS Contract | 100 | $ 19.80* | $1,980.20 | 105 | $18.86* | $1,980.20 |
| Annual Stock Dividend | | $ 5.00 | | | $ 5.00 | |
| Termination Claim | | $100.00 | | | $95.24 | |

*Rounded to nearest cent.

Corporate Events Resulting in the Termination of the Adjustable DORS Derivative Contracts In accordance with an exemplary embodiment of the claimed invention as illustrated in Table 24, the corporate events involve transactions involving the distribution of securities other than cash or common stock, such as bonds, preferred stocks, commodities, warrants and the like, which terminates the adjustable DORS derivative contracts. The corporate event can involve Distribution of securities only or a combination of cash and securities. If only adjustable OWLS and RISKS are trading, then the adjustable OWLS and RISKS derivative contracts are terminated, and the processor determines the Adjusted Termination Claim by calculating the present value of the Termination Claim (PVTC) based on the time to termination of the contract discounted at the risk free rate to allocate the Distribution between the adjustable OWLS and RISKS holders/owners. If the value of the Distribution is less than or equal to the present value of the Termination Claim (PVTC), then the entire Distribution is given to the adjustable OWLS holder/owner and the adjustable RISKS holder/owner receives no portion of the Distribution. However, if the value of the Distribution is greater than the present value of the Termination Claim, then the adjustable OWLS holder gets the value of the Distribution up to the Adjusted Termination Claim and the adjustable RISKS holder gets the value of the Distribution above the Adjusted Termination Claim.

All adjustable DORS derivative contracts can be prematurely terminated by the issuer. At termination of the adjustable DIVS derivative contract, the adjustable DIVS holder/owner receives an amount up to the sum of: (i) five percent (5.0%) of the Cash Portion of the Distribution multiplied by the number of days remaining in the Contract divided by the total number of days in the contract (DTM/total days of contract); and (ii) the present value of the reduction of the dividend, if any, paid on the underlying stock over the remainder of the term of the contract. Alternatively, the adjustable DIVS holder/owner receives an amount up to the present value of the reduction, if any, in the dividend paid on the underlying stock over the remainder of the term of the contract, discounted at the risk free rate. It is appreciated that the maximum payment to the DIVS holder/owner is the value of the Cash Portion of the Distribution. The Cash Portion of the Distribution is reduced by the payment to the adjustable DIVS holder/owner to obtain the Adjusted Cash Portion. The value of the Distribution is also reduced by the payment to the adjustable DIVS holder/owner to obtain an Adjusted Distribution Value to be allocated between the adjustable OWLS and RISKS holders/owners. That is, the Adjusted Distribution Value consists of any cash left after the payment to the adjustable DIVS holder/owner and the non-Cash Portion of the Distribution.

In accordance with an exemplary embodiment of the claimed invention, at the termination of the adjustable OWLS and RISKS derivative contracts, the processor determines the Adjusted Termination Claim by calculating the present value of the Termination Claim (PVTC) based on the time to termination of the contract discounted at the risk free rate. If the Adjusted Distribution Value is less than or equal to the present value of the Termination Claim (PVTC), then the entire Adjusted Distribution Value is given to the adjustable OWLS holder/owner and the adjustable RISKS holder/owner receives no portion of the Distribution. However, if the Adjusted Distribution Value is greater than the present value of the Termination Claim, then the adjustable OWLS holder gets the Adjusted Distribution Value up to the Adjusted Termination Claim and the adjustable RISKS holder gets the Adjusted Distribution Value above the Adjusted Termination Claim. The parts of the Distribution are allocated to the adjustable OWLS and RISKS holder/owner on a pro rata basis.

In accordance with an exemplary embodiment of the claimed invention, at the termination of the adjustable OWLS and RISKS derivative contracts, the processor reduces the original Termination Claim by the future value of the payment to the adjustable OWLS holder/owner discounted at the OWLS internal rate of return (IRR) to obtain the Adjusted Termination Claim. That is, the Adjusted Termination Claim is obtained by reducing the Termination Claim by the future value of the payment to the adjustable OWLS holder/owner and the payment/distribution of a portion or full Adjusted Distribution Value is made to the OWLS holder/owner to make up for the decrease in the Termination Claim. The Adjusted Termination Claim is used to determine the payout to the adjustable OWLS and RISKS holders/owners at the termination date. If the Adjusted Distribution Value is less than or equal to the Adjusted Termination Claim, then the entire Adjusted Distribution Value is given to the adjustable OWLS holder/owner and the adjustable RISKS holder/owner receives no portion of the Distribution. However, if the Adjusted Distribution Value is greater than the Adjusted Termination Claim, then the adjustable OWLS holder gets the Adjusted Distribution Value up to the Adjusted Termination Claim and the adjustable RISKS holder gets the Adjusted Distribution Value above the Adjusted Termination Claim. The parts of the Distribution remaining after payment are allocated to the adjustable OWLS and RISKS holder/owner on a pro rata basis.

TABLE 24

CORPORATE EVENTS RESULTING IN THE TERMINATION OF
THE DORS DERVIATIVE CONTRACTS
(Trading in OWLS, RISKS and DIVS)
(Contract based on 100 shares)
(Corporate events comprised of securities other than cash
and common stock)

Assumed Stock Parameters and Derivative Contract Prices

| | | | |
|---|---|---|---|
| Dividend | $ 5.00 | Stock Price | $105.00 |
| Days to Term | 1460 | RISKS Price (b) | 15.32 |
| Years to Term | 4 | OWLS Price | 71.84 |
| Termination Claim | $ 100.00 | DIVS Price (c) | 17.84 |
| Standard Deviation | 16% | | |
| Risk Free Rate (a) | 6% | | |

(a) The interest rate on Treasury obligations matched to the RISKS termination date.
(b) RISKS pricing based on Black/Scholes formula.
(c) Based on the risk free rate and assuming no dividend growth
In the case of no DIVS trading, then skip step 1 and start with step 2:
1. The payment to the DIVS is the sum up to:
   a. 5.0% of the Cash portion of the Distribution multiplied by the number of days remaining in the contract divided by the total number of days in the contract (DTM/Total days of contract); and
   b. The present value of the reduction of the dividend, if any, paid on the underlying stock over the reminder of the term of the contract.
2. Adjusted Distribution Value = value of the parts of the Distribution (cash and securities) reduced by the payment to the DIVS.
3. Determined Adjusted Termination Claim by adjusting the Termination Claim to the present value of the original Termination Claim (PVTC) based on the time to termination of the contract discounted at the risk free rate.
4. If the Adjusted Distribution Value is less than or equal to the Adjusted Termination Claim, the OWLS gets all of the Adjusted Distribution Value.
5. If the Adjusted Distribution Value is greater than the Adjusted Termination Claim:
   a. The OWLS get Adjusted Distribution Value up to the Adjusted Termination Claim; and
   b. The RISKS get the Adjusted Distribution Value above the Adjusted Termination Claim.

As illustrated in Table 25, the exemplary corporate event involves Distribution with a market value of $150 comprising bonds, preferred stock and Cash Portion of $30. Assumed stock parameters and derivative contract prices are set forth in Table 26 and announcement by the company that the dividend is discontinued. That is, the annual dividend is reduced by $5.00 to zero due to the extraordinary liquidating cash payment. In accordance with an exemplary embodiment of the claimed invention, at termination of the adjustable DIVS derivative contract, the adjustable DIVS holder/owner gets $19.04, the amount up to the sum of: (i) five percent (5.0%) of the Cash Portion of the Distribution multiplied by the number of days remaining in the Contract divided by the total number of days in the contract (DTM/total days of contract) or $1.20=$30*0.05*(1460/1825); and (ii) the present value of the reduction of the dividend, if any, paid on the underlying stock over the remainder of the term of the contract or $17.84=PV of $5.00 for 4 years discounted at 6.0%. Alternatively, the adjustable DIVS holder/owner receives an amount up to the present value of the reduction, if any, in the dividend paid on the underlying stock over the remainder of the term of the contract, discounted at the risk free rate. The value of the Distribution is reduced by the payment to the adjustable DIVS holder/owner to obtain an Adjusted Cash Portion ($10.96=$30.00−$19.04) and an Adjusted Distribution Value ($130.96=$150.00−$19.04) to be allocated between the adjustable OWLS and RISKS holders/owners at the termination of the adjustable OWLS and RISKS derivative contract.

In accordance with an exemplary embodiment of the claimed invention, the processor calculates the present value of the Termination Claim (PVTC) based on the time to termination of the contract discounted at the risk free rate or $79.21=$100/[(1+0.06)^(1460/365)]. Since the Adjusted Distribution Value of $130.96 is greater than the Adjusted Termination Claim (PVTC=$79.21), the Adjusted Distribution Value of $130.96 is allocated between the adjustable OWLS and RISKS holders/owners. At the termination of the adjustable OWLS derivative contract, the adjustable OWLS holder/owner gets the Adjusted Distribution Value up to the Adjusted Termination Claim (PVTC) or $79.21, thereby compensating the OWLS holder/owner for the decrease in the Termination Claim. The RISKS holder/owner gets the Adjusted Distribution Value above the Adjusted Termination Claim or $51.75=$130.96−$79.21, at the termination of the adjustable RISKS derivative contract.

In accordance with an exemplary embodiment of the claimed invention, at the termination of the adjustable OWLS and RISKS derivative contracts, the processor reduces the original Termination Claim by the future value of the payment to the adjustable OWLS holder/owner discounted at the OWLS internal rate of return (IRR) to obtain the Adjusted Termination Claim. That is, the Adjusted Termination Claim is obtained by reducing the Termination Claim by the future value of the payment to the adjustable OWLS holder/owner and the payment/distribution of a portion or full Adjusted Distribution Value is made to the OWLS holder/owner to make up for the decrease in the Termination Claim. The Adjusted Termination Claim is used to determine the payout to the adjustable OWLS and RISKS holders/owners at the termination date. If the Adjusted Distribution Value is less than or equal to the Adjusted Termination Claim, then the entire Adjusted Distribution Value is given to the adjustable OWLS holder/owner and the adjustable RISKS holder/owner receives no portion of the Distribution. However, if the Adjusted Distribution Value is greater than the Adjusted Termination Claim, then the adjustable OWLS holder gets the Adjusted Distribution Value up to the Adjusted Termination Claim and the adjustable RISKS holder gets the Adjusted Distribution Value above the Adjusted Termination Claim. The parts of the Distribution remaining after payment are allocated to the adjustable OWLS and RISKS holder/owner on a pro rata basis.

The parts of the Distribution remaining after payment to the adjustable DIVS holder/owner are distributed to the adjustable OWLS and RISKS holders/owners on a pro rata basis at the termination of the adjustable DORS derivative contract. The adjustable OWLS holder/owner's allocated percentage of the Adjusted Distribution Value is 60.48%=100*$79.21/($79.21+51.75) and the adjustable RISKS holder/owner's allocated percentage of the Adjusted Distribution Value is 39.52%=100*$51.75/($79.21+$51.75). The allocation of the Adjusted Distribution Value is based on 100 shares per adjustable DORS derivative contract. At the termination of the adjustable DORS derivative contract, the total payment to the adjustable DIVS holder/owner is $1904=100*$19.04. The adjustable OWLS holder/owner receives 60.48% of the Adjusted Cash Portion or $662.86=60.48%*$1096; 60.48% of the preferred stock distribution or 30 shares of preferred stock=integer of (100*60.48%*0.50 shares); and 60.48% of the bonds distribution or 45=integer of (100*60.48%*0.75). The adjustable RISKS holder/owner receives 39.52% of the Adjusted Cash Portion or $433.14=39.528%*$1096; 39.52% of the preferred stock distribution or 19 shares of preferred stock=integer of (100*39.52%*0.50 shares); and 39.52% of the bonds distribution or 29=integer of (100*39.52%*0.75).

In accordance with an exemplary embodiment of the claimed invention, the methods for implementing the claimed invention can be implemented using processor-executable instructions for directing operation of a device or devices under processor control (e.g., processor based computer or server and the like), the processor-executable instructions can be stored on a tangible computer-readable medium, such as but not limited to a disk, CD, DVD, flash memory, portable storage or the like. The processor-executable instructions can be accessed from a service provider's website or stored as a set of downloadable processor-executable instructions, for example or downloading and installation from an Internet location (e.g. Web server).

In accordance with an exemplary embodiment of the claimed invention, a non-transitory computer readable storage medium comprises computer executable code for adjusting a derivative contract to account for time value of money due to an occurrence of a corporate event that affects the value of the derivative contract. The claimed code comprises instructions for adjusting the termination claim of the derivative contract to account for time value of money by a processor, thereby affecting the value of said derivative contract. The derivative contract is based on one of a plurality of economic interests of at least two shares of an underlying security. The claimed code further comprises instructions for the processor to adjust a provision of the derivative contract based on distributions to the underlying security and to store the adjusted termination claim and the adjusted derivative contract in a database.

In accordance with an exemplary embodiment of the claimed invention, a system for adjusting a derivative contract to account for time value of money due to an occurrence of a corporate event that affects the value of the derivative contract comprises a processor and a database. The processor adjusts

TABLE 25

DISTRIBUTION OF CASH, BOND AND PREFERRED STOCK
(Trading in OWLS, RISKS and DIVS)

| | | |
|---|---|---|
| Cash Distribution | $ 30.00 | Announced by the Company |
| Shares of Preferred Stock | 0.5 | Announced by the Company |
| Bonds | 0.75 | Announced by the Company |
| Market value of Distribution | $ 150.00 | |
| New Stock Dividend | $ 0.00 | Dividend discontinued by the Company |
| Reduction in Dividend | $ 5.00 | Dividend discontinued by the company |
| Payment to DIVS | $ 19.04 | $19.04 = $1.20 + $17.84 |
| i. Portion of Cash | $ 1.20 | $1.20 = $30*.05*(1460/1825) |
| ii. PV of Div decrease | $ 17.84 | $17.84 = PV of $5.00 for 4 years discounted at 6.0% |
| Adjusted Term Claim | $ 79.21 | PV of $100 discounted at 6% over 4 years; $79.21 = $100/[(1 + .06)^(1460/365)] |
| Adjusted Cash Portion | $ 10.96 | Cash Portion less payment to DIVS ($10.96 = $30 − $19.04) |
| Adjusted Distribution Value | $ 130.96 | Value of the Distribution reduced by payment to DIVS ($130.96 = $150 − $19.04) |
| OWLS portion of Adjusted Distribution Value | $ 79.21 | OWLS get Adjusted Distribution Value up to the Adjusted Termination Claim |
| RISKS portion of Adjusted Distribution Value | $ 51.75 | RISKS get Adjusted Distribution Value above the Adjusted Termination Claim |
| OWLS % of Adjusted Distribution Value | 60.48% | 60.48% = 100 * $79.21/($79.21 + $51.75) |
| RISKS % of Adjusted Distribution Value | 39.52% | 39.52% = 100 * $51.75/($79.21 + $51.75) |
| Adjusted Cash Portion per contract | $1096.00 | Distribution based on 100 shares per adjustable DORS (DIVS, OWLS, RISKS) derivative contract |
| OWLS Cash Portion | $ 662.86 | $662.86 = 60.48% * $1096.00 |
| OWLS Preferred | 30 shares | 30 shares = integer of 100* 60.48% * 0.50 |
| OWLS Bond | 45 | 45 = integer of 100 * 60.48% * 0.75 |
| RISKS Cash Portion | $ 433.14 | $662.86 = 39.52% * $1096.00 |
| RISKS Preferred | 19 shares | 19 shares = integer of 100* 39.52% * 0.50 |
| RISKS Bond | 29 | 45 = integer of 100 * 39.52% * 0.75 | a termination claim of the derivative contract to account for time value of money, thereby affecting the value of the derivative contract, and adjusts a provision of the derivative contract based on distributions to an underlying security. The derivative contract is based on one of a plurality of economic interests of at least two shares of the underlying security. The database stores the adjusted termination claim and the adjusted derivative contract.

In accordance with an exemplary embodiment of the claimed invention, the issuer can force a premature liquidation of the European style derivative contract if the adjusted terms of the derivative contract (i.e., European style derivative contract) becomes unattractive to the investors and does not trade or the trade volume is low.

In accordance with an exemplary embodiment of the claimed invention, the corporate events involve transactions involving the distribution of securities other than cash or common stock, such as bonds, preferred stocks, commodities, warrants and the like, which terminates the adjustable DORS derivative contracts. The corporate event can involve Distribution of securities only or a combination of cash and securities. Any cash portion can be handled as a Partial Liquidating Dividend, as described in Table 14, and the securities other than common stock can be treated as a split-up, as described in Table 21.

It is appreciated that any corporate actions or events not covered specifically herein would be administered in a manner as close to possible to the rules described herein. The sponsor and the option exchanges trading the DORS contracts would have the ultimate authority for determining the corporate distributions to the DORS owners.

While the claimed invention has been particularly described with respect to the illustrated embodiments, it will be appreciated that various alterations, modifications and adaptations may be made based on the present disclosure, and are intended to be within the scope of the claimed invention. It is appreciated that although the invention has been described with respect to two or three derivative contracts, each based on one of the economic interests of the underlying security, the disclosed invention may be similarly applied to any number of derivative contracts, each based on one of the economic interests of the underlying security. It is intended that the appended claims be interpreted as including the embodiments discussed above, the various alternatives that have been described, and all equivalents thereto.

What is claimed:

1. A method for adjusting provisions of derivative contracts to account for time value of money due to an occurrence of a corporate event that affects the value of the derivative contract, comprising the steps of:
    receiving, via a processor based computer, financial information regarding an option with limited stock (OWLS) derivative contract representing an economic interest corresponding to a nucleus of at least two shares of an underlying security and a residual interest in stock (RISKS) derivative contract representing an economic interest corresponding to speculation on future gains on the value of said at least two shares of the same underlying security, each derivative contract comprising at least a termination claim of said each derivative contract and the length of said each derivative contract, and wherein the termination claim determines the payout to the OWLS derivative contract at the end of the two derivative contracts based on the same underlying security;
    receiving, via the computer, information identifying a corporate event that affects the value of a derivative contract;
    adjusting, via the computer, the termination claim of the derivative contract by reducing the termination claim by a future value of a payment to the OWLS discounted at an OWLS internal rate of return (IRR) to the termination claim;
    adjusting, via the computer, one or more provisions of the derivative contract based on the adjusted termination claim and a predetermined formula for determining the effect of the corporate event on the derivative contract based on a type of distribution to the underlying security; and
    storing an adjusted termination claim and an adjusted derivative contract in a database.

2. The method of claim 1, further comprises the step of allocating the value of said at least two shares of the underlying security into the OWLS and RISKS derivative contracts.

3. The method of claim 1, wherein the type of the distribution to the underlying security is a cash distribution; and further comprising the steps of:
    allocating entire cash distribution to the OWLS derivative contract if the cash distribution is less than or equal to an average price of the OWLS over a predetermined number of days before the announcement of the corporate event which is referred to as an Average OWLS Price;
    allocating a portion of the cash distribution up to the Average OWLS Price to the OWLS derivative contract if the cash distribution is greater than the Average OWLS Price; and
    allocating a remaining portion of the cash distribution to the RISKS derivative contract if the cash distribution is greater than the present value of the termination claim.

4. The method of claim 1, further comprising the step of reducing the adjusted termination claim to zero for the corporate event involving a full liquidating dividend.

5. The method of claim 1, further comprising the step of allocating payment in cash or securities to the OWLS and RISKS derivative contracts based on the adjusted termination claim at termination of the OWLS and RISK derivative contracts.

6. The method of claim 1, further comprising the step of forcing premature liquidation of said plurality of derivative contracts by an issuer of said plurality derivative contracts.

7. The method of claim 1, further comprises the steps of:
    receiving, via the computer, the financial information regarding the OWLS derivative contract, the DIVS contract and a dividend value of stock (DIVS) derivative contract representing a stream of dividends distributed to a holder of said at least two shares of the same underlying security; and
    allocating the value of said at least two shares of the underlying security into the DIVS, OWLS and RISKS derivative contracts.

8. The method of claim 7, wherein the type of the distribution to the underlying security is a cash distribution; and further comprising the steps of:
    allocating to the DIVS derivative contract a portion of the cash distribution up to a present value of a reduction of a dividend paid on the underlying security over a remaining term of the DIV derivative contract discounted at a risk free rate;
    reducing the cash distribution by a payment to the DIVS derivative contract to obtain an adjusted cash distribution;

allocating entire adjusted cash distribution to the OWLS derivative contract if the adjusted cash distribution is less than or equal to an average price of the OWLS over a predetermined number of days before the announcement of the corporate event which is referred to as an Average OWLS Price;

allocating a portion of the adjusted cash distribution up to the Average OWLS Price to the OWLS derivative contract if the adjusted cash distribution is greater than the Average OWLS Price;

allocating a remaining portion of the adjusted cash distribution to the RISKS derivative contract if the adjusted cash distribution is greater than the present value of the termination claim; and adjusting the adjusted termination claim to zero for the corporate event involving a full liquidating dividend.

9. The method of claim 7, further comprising the steps of:

allocating a payment equal to present value of dividends discounted at the risk free rate at termination of the DIVS derivative contract; and allocating payment in cash or securities to the OWLS and RISKS derivative contracts based on the adjusted termination claim at termination of the OWLS and RISK derivative contracts.

10. The method of claim 7, further comprising the step of forcing premature liquidation of said plurality of derivative contracts by an issuer of said plurality derivative contracts.

11. A non-transitory computer readable storage medium comprising computer executable code for adjusting a derivative contract to account for time value of money due to an occurrence of a corporate event that affects the value of the derivative contract, said code comprising instructions for:

receiving, via a processor based computer, financial information regarding an option with limited stock (OWLS) derivative contract representing an economic interest corresponding to a nucleus of at least two shares of an underlying security and a residual interest in stock (RISKS) derivative contract representing an economic interest corresponding to speculation on future gains on the value of said at least two shares of the same underlying security, each derivative contract comprising at least a termination claim of said each derivative contract and the length of said each the derivative contract, and wherein the termination claim determines the payout to the OWLS derivative contract at the end of the two derivative contracts based on the same underlying security;

receiving, via the computer, information identifying a corporate event that affects the value of the derivative contract;

adjusting, via the computer, the termination claim of the derivative contract by reducing the termination claim by a future value of a payment to the OWLS discounted at an OWLS internal rate of return (IRR) to the termination claim;

adjusting, via the computer, one or more provisions of the derivative contract based on the adjusted termination claim and a predetermined formula for determining the effect of the corporate event on the derivative contract based on a type of distribution to the underlying security; and storing an adjusted termination claim and an adjusted derivative contract in a database.

12. The computer readable storage medium of claim 11, wherein the type of the distribution to the underlying security is a cash distribution; and wherein said code further comprises instructions for:

allocating entire cash distribution to the OWLS derivative contract if the cash distribution is less than or equal to an average price of the OWLS over a predetermined number of days before the announcement of the corporate event which is referred to as an Average OWLS Price;

allocating a portion of the cash distribution up to the Average OWLS Price to the OWLS derivative contract if the cash distribution is greater than the Average OWLS Price;

allocating a remaining portion of the cash distribution to the RISKS derivative contract if the cash distribution is greater than the present value of the termination claim; and adjusting the adjusted termination claim to zero for the corporate event involving a full liquidating dividend.

13. The computer readable storage medium of claim 11, wherein said code further comprises instructions for allocating payment in cash or securities to the OWLS and RISKS derivative contracts based on the adjusted termination claim at termination of the OWLS and RISK derivative contracts.

14. The computer readable storage medium of claim 11, wherein the type of the distribution to the underlying security is a cash distribution; and wherein said code further comprises instructions for:

receiving, via the computer, the financial information regarding the OWLS derivative contract, the DIVS contract and a dividend value of stock (DIVS) derivative contract representing a stream of dividends distributed to a holder of said at least two shares of the same underlying security;

allocating to the DIVS derivative contract a portion of the cash distribution up to a present value of a reduction of a dividend paid on the underlying security over a remaining term of the DIVS derivative contract discounted at a risk free rate;

reducing the cash distribution by a payment to the DIVS derivative contract to obtain an adjusted cash distribution;

allocating entire adjusted cash distribution to the OWLS derivative contract if the adjusted cash distribution is less than or equal to an average price of the OWLS over a predetermined number of days before the announcement of the corporate event which is referred to as an Average OWLS Price;

allocating a portion of the adjusted cash distribution up to the Average OWLS Price to the OWLS derivative contract if the adjusted cash distribution is greater than the Average OWLS Price;

allocating a remaining portion of the adjusted cash distribution to the RISKS derivative contract if the adjusted cash distribution is greater than the present value of the termination claim; and adjusting the adjusted termination claim to zero if the corporate event involves a full liquidating dividend.

15. The computer readable storage medium of claim 14, wherein said code further comprises instructions for:

allocating a payment equal to present value of dividends discounted at the risk free rate at termination of the DIVS derivative contract; and allocating payment in cash or securities to the OWLS and RISKS derivative contracts based on the adjusted termination claim at termination of the OWLS and RISK derivative contracts.

16. A system for adjusting a derivative contract to account for time value of money due to an occurrence of a corporate event that affects the value of the derivative contract, comprising:

a processor based computer programmed to:
receive financial information regarding an option with limited stock (OWLS) derivative contract representing an economic interest corresponding to a nucleus of at least two shares of an underlying security and a residual interest in stock (RISKS) derivative contract representing an economic interest corresponding to speculation on future gains on the value of said at least two shares of the same underlying security, each derivative contract comprising at least a termination claim of said each derivative contract and the length of said each derivative contract, and wherein the termination claim determines the payout to the OWLS derivative contract at the end of the two derivative contracts based on the same underlying security;

receive information identifying a corporate event that affects the value of a derivative contract;

adjust the termination claim of the derivative contact by reducing the termination claim by a future value of a payment to the OWLS discounted at an OWLS internal rate of return (IRR) to the termination claim;

adjust one or more provisions of the derivative contract based on the adjusted termination claim and a predetermined formula for determining the effect of the corporate event on the derivative contract based on a type of distribution to the underlying security; and a database to store an adjusted termination claim and an adjusted derivative contract.

17. The system of claim 16, wherein the type of the distribution to the underlying security is a cash distribution; wherein the computer allocates entire cash distribution to the OWLS derivative contract if the cash distribution is less than or equal to an average price of the OWLS over a predetermined number of days before the announcement of the corporate event which is referred to as an Average OWLS Price; wherein if the cash distribution is greater than the Average OWLS Price, the computer allocates a portion of the cash distribution up to the Average OWLS Price to the OWLS derivative contract and allocates a remaining portion of the cash distribution to the RISKS derivative contract; and wherein the computer reduces the adjusted termination claim to zero if the corporate event involves a full liquidating dividend.

18. The system of claim 16, wherein the computer allocates payment in cash or securities to the OWLS and RISKS derivative contracts based on the adjusted termination claim at termination of the OWLS and RISK derivative contracts.

19. The system of claim 16, wherein the computer receives the financial information regarding the OWLS derivative contract, the RISKS derivative contract, and a dividend value of stock (DIVS) derivative contract representing a stream of dividends distributed to a holder of said at least two shares of the same underlying security; wherein the type of the distribution to the underlying security is a cash distribution; wherein the computer allocates to the DIVS derivative contract a portion of the cash distribution up to a present value of a reduction of a dividend paid on the underlying security over a remaining term of the DIVS derivative contract discounted at a risk free rate; wherein the computer reduces the cash distribution by a payment to the DIVS derivative contract to obtain an adjusted cash distribution; wherein the computer allocates entire adjusted cash distribution to the OWLS derivative contract if the adjusted cash distribution is less than or equal to an average price of the OWLS over a predetermined number of days before the announcement of the corporate event which is referred to as an Average OWLS Price; wherein if the adjusted cash distribution is greater than the Average OWLS Price, the computer allocates a portion of the adjusted cash distribution up to the Average OWLS Price to the OWLS derivative contract and allocates a remaining portion of the adjusted cash distribution to the RISKS derivative contract; and wherein the computer reduces the adjusted termination claim to zero if the corporate event involves a full liquidating dividend.

20. The system of claim 19, wherein the computer allocates a payment equal to present value of dividends discounted at the risk free rate at termination of the DIVS derivative contract, and allocates payment in cash or securities to the OWLS and RISKS derivative contracts based on the adjusted termination claim at termination of the OWLS and RISK derivative contracts.

* * * * *